US012804372B2

(12) United States Patent
Shi et al.

(10) Patent No.: US 12,804,372 B2
(45) Date of Patent: Nov. 17, 2026

(54) DISCOVERY OF INTERNET OF THINGS NETWORK

(71) Applicant: InterDigital Patent Holdings, Inc., Wilmington, DE (US)

(72) Inventors: Xiaoyan Shi, Lake Oswego, OR (US); Taimoor Abbas, Sainte-Julie (CA); Tezcan Cogalan, London (GB); Saad Ahmad, Montreal (CA); Anuj Sethi, Ottawa (CA); Michael Starsinic, Newtown, PA (US); Alec Brusilovsky, Downingtown, PA (US); Debashish Purkayastha, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 99 days.

(21) Appl. No.: 18/571,709

(22) PCT Filed: Jun. 23, 2022

(86) PCT No.: PCT/US2022/034740

§ 371 (c)(1),
(2) Date: Dec. 18, 2023

(87) PCT Pub. No.: WO2022/271957

PCT Pub. Date: Dec. 29, 2022

(65) Prior Publication Data

US 2024/0314534 A1 Sep. 19, 2024

Related U.S. Application Data

(60) Provisional application No. 63/338,780, filed on May 5, 2022, provisional application No. 63/276,236, filed on Nov. 5, 2021, provisional application No. 63/215,162, filed on Jun. 25, 2021.

(51) Int. Cl.

| | |
|---|---|
| ***H04W 8/00*** | (2009.01) |
| ***G16Y 10/75*** | (2020.01) |
| ***G16Y 40/35*** | (2020.01) |
| ***H04W 12/06*** | (2021.01) |
| ***H04W 12/08*** | (2021.01) |
| ***H04W 76/14*** | (2018.01) |

(52) U.S. Cl.

CPC ............. *H04W 8/005* (2013.01); *G16Y 10/75* (2020.01); *G16Y 40/35* (2020.01); *H04W 12/06* (2013.01); *H04W 12/08* (2013.01); *H04W 76/14* (2018.02)

(58) Field of Classification Search

None

See application file for complete search history.

(56) References Cited

FOREIGN PATENT DOCUMENTS

| | | | | |
|---|---|---|---|---|
| CN | 105009518 A | * 10/2015 | ............ | H04W 84/18 |
| WO | WO-2018208289 A1 | * 11/2018 | ............ | H04W 12/04 |
| WO | WO-2023014602 A1 | * 2/2023 | ............ | H04W 40/22 |

OTHER PUBLICATIONS

Khalil, Kasem et al. A Comparative Analysis on Resource Discovery Protocols for The Internet of Things. 2018 IEEE Global Communications Conference (GLOBECOM). Dec. 2018. 7 pages. (Year: 2018).*

Fathima, Nasreen et al. Optimized Neighbor Discovery in Internet of Things (IoT). 2017 International Conference on Electrical, Electronics, Communication, Computer, and Optimization Techniques (ICEECCOT). Dec. 2017. 5 pages (Year: 2017).*

Zorgati, Hela et al. Service discovery techniques in Internet of Things: a survey. 2019 IEEE International Conference on Systems, Man and Cybernetics (SMC). Oct. 2019. 6 pages (Year: 2019).*

3rd Generation Partnership Project(3GPP), TR 22.859 V18.0.1, "Technical Specification Group Services and System Aspects, Study on Personal Internet of Things (PloT) Networks (Release 18)", Jun. 2021, pp. 1-47.

3rd Generation Partnership Project(3GPP), TR 23.700-88 V0.2.0, "Technical Specification Group Services and System Aspects, Study on Architecture Enhancement for Personal loT Network (PIN) (Release 18)", Apr. 2022, pp. 1-60.

3rd Generation Partnership Project(3GPP), TS 23.303 V16.0.0, "Technical Specification Group Services and System Aspects, Proximity-based services (ProSe), Stage 2 (Release 16)", Jul. 2020, pp. 1-130.

3rd Generation Partnership Project (3GPP), S1-202145, "New WID on Study on Personal IoT networks", 3GPP SA WG1 Meeting#90-e, vivo Mobile Communication Ltd, China Telecom, Qualcomm Incorporated, Convida Wireless, May 18-22, 2020, 3 pages.

3rd Generation Partnership Project (3GPP), S2-2202951, "Solution for KI#2: PIN and pin Element Discovery", 3GPP TSG-SA WG2 Meeting #150-e, Electronic meeting Apr. 6-12, 2022, 2 pages.

3rd Generation Partnership Project (3GPP), S2-2203519, "Solution for Kl#2: PIN and PIN Element Discovery", 3GPP TSG-SA WG2 Meeting #150-e, Electronic Meeting; Agenda item: 9.16, Apr. 6-12, 2022, 4 pages.

(Continued)

*Primary Examiner* — Jeffrey R Swearingen

(74) *Attorney, Agent, or Firm* — CONDO ROCCIA KOPTIW LLP

(57) ABSTRACT

Systems, methods, and instrumentalities may be provided to discover a personal Internet of Things (IoT) network (PIN). A discovery policy configuration information associated with a PIN may be determined. The discovery policy configuration information may comprise a PIN identification (ID) and may indicate that discovery for the PIN may be enabled. A first message may be sent to a second WTRU if discovery for the PIN is enabled. The first message may be based on the discovery policy configuration information and may indicate the PIN ID. A second message may be received from the second WTRU. The second message may indicate the PIN ID and may indicate a request for information associated with the PIN. A third message may be sent to the second WTRU. The third message may indicate the PIN ID and may indicate the requested information that may be associated with the PIN.

20 Claims, 14 Drawing Sheets

(56) References Cited

OTHER PUBLICATIONS

3rd Generation Partnership Project (3GPP), S2-2204617, "KI #2, Sol #4a/4b: Update to Fill in the Impact Sections and Editorials", 3GPP TSG-WG SA2 Meeting #151E e-meeting, Elbonia, May 16-20, 2022, pp. 1-4.
3rd Generation Partnership Project (3GPP), TR 22.859 V2.0.0, "Technical Specification Group Services and System Aspects, Study on Personal Internet of Things (PIoT) Networks (Release 18)", Jun. 2021, pp. 1-47.
3rd Generation Partnership Project (3GPP), TS 23.304 V1.0.0, "Technical Specification Group Services and System Aspects, Proximity based Services (ProSe) in the 5G System (5GS) (Release 17)", Jun. 2021, pp. 1-90.
3rd Generation Partnership Project (3GPP), TS 23.501 V16.0.0, "Technical Specification Group Services and System Aspects, System Architecture for the 5G System, Stage 2 (Release 16)", Mar. 2019, pp. 1-318.
3rd Generation Partnership Project (3GPP), TS 23.502 V16.0.0, "Technical Specification Group Services and System Aspects, Procedures for the 5G System, Stage 2 (Release 16)", Mar. 2019, pp. 1-420.
3GPP TR 22.859, "3rd Generation Partnership Project; Technical Specification Group Services and System Aspects; Study on Personal Internet of Things (PloT) networks (Release 18)", Jun. 2021, 5 pages.

* cited by examiner

DISCOVERY OF INTERNET OF THINGS NETWORK

CROSS-REFERENCE TO RELATED APPLICATIONS

This application is the National Stage Entry under 35 U.S.C. § 371 of Patent Cooperation Treaty Application No. PCT/US2022/034740, filed Jun. 23, 2022, which claims the benefit of U.S. Provisional Application No. 63/215,162, filed Jun. 25, 2021; U.S. Provisional Application No. 63/276,236 filed Nov. 5, 2021; and U.S. Provisional Application No. 63/338,780 filed May 5, 2022; the contents of which are hereby incorporated herein by reference in their entireties.

BACKGROUND

Devices that communicate using a traditional cellular network may be designed such that they have Internet of Things (IoT) features and/or capabilities. These devices (e.g., with IoT capabilities) may improve power consumption and/or may increase the network efficiency, for example, for bulk operations.

SUMMARY

Systems, methods, and instrumentalities are described herein that are associated with the discovery of a personal Internet of Things (IoT) network (PIN). In examples, a PIN element (PINE) may discover PIN information by sending a solicitation request and/or receiving a solicitation response. In examples, a PINE may be a wireless transmit/receive unit (WTRU). In examples, a PIN element may send an assistance discovery request message to a PIN gateway, a PIN element having PIN management capabilities, and/or other PIN elements. In examples, a PIN element may discover other PIN group members based on a group discovery policy. A PIN gateway may discover PIN group information and/or may provide the PIN group information to other PIN elements. A PIN element may be configured with one or more discovery restriction levels. A PIN element may provide PIN information to other PIN elements if the PIN information matches the discovery restriction levels configured for the other PIN elements. In examples, PIN elements may broadcast its reachability status, which may indicate that the PIN element may be accessed directly or via a PIN gateway (GW) or a PIN relay.

The format of the pin element (PINE) identity and the credential information to be configured in a PINE may be provided. The system (e.g., 5G system) may be enhanced so that a PINE with management capabilities (PEMC) may authenticate and/or authorize a PINE that has been provisioned with an identity and a credential. The system (e.g., 5GC) may be able to assist with an authentication and authorization procedure that is executed between a PEMC and PINE.

When a PINE is authenticated and/or authorized by the PEMC, the PINE may be able to communicate with a PINE with gateway capabilities (PEGC) of the PIN. The PEMC may assist the PEGC in authenticating and/or authorizing a PINE.

Systems, methods, and instrumentalities are described herein that are associated with the discovery of a personal Internet of Things (IoT) network (PIN). Discovery policy configuration information associated with a personal Internet of Things (IoT) network (PIN) may be determined. The discovery policy configuration information may comprise a PIN identification (ID). The discovery policy configuration information may indicate that discovery for the PIN is enabled. A first message may be sent to a WTRU (e.g., another WTRU). For example, a first message may be sent to the WTRU if discovery for the PIN has been enabled. The first message may be based on the discovery policy configuration information. The first message may indicate the PIN ID. A second message may be received from the WTRU. The second message may indicate the PIN ID and may indicate a request for information associated with the PIN. A third message may be sent to the WTRU. The third message may indicate the PIN ID and may indicate the requested information associated with the PIN.

Systems, methods, and instrumentalities are described herein that are associated with the discovery of a personal Internet of Things (IoT) network (PIN). A solicitation request message may be received from a WTRU (e.g., another WTRU). The solicitation request message may indicate a personal Internet of Things network (PIN) identification (ID) that is associated with a PIN. The solicitation request message indicates a request for information that is associated with the PIN. A solicitation response message may be sent to the WTRU. The solicitation response message may indicate the PIN ID. The solicitation response message may indicate the requested information that is associated with the PIN. A request message may be received from the WTRU. The request message may be based on the requested information. The request message may indicate the PIN ID. The request message may indicate a WTRU ID that is associated with the WTRU. The request message may indicate a request to join the PIN. A response message may be received from the WTRU, for example, when the WTRU ID has been authenticated. The response message may indicate that the WTRU is authorized to join the PIN. The response message may indicate authorization information.

DETAILED DESCRIPTION

Figure 1A:
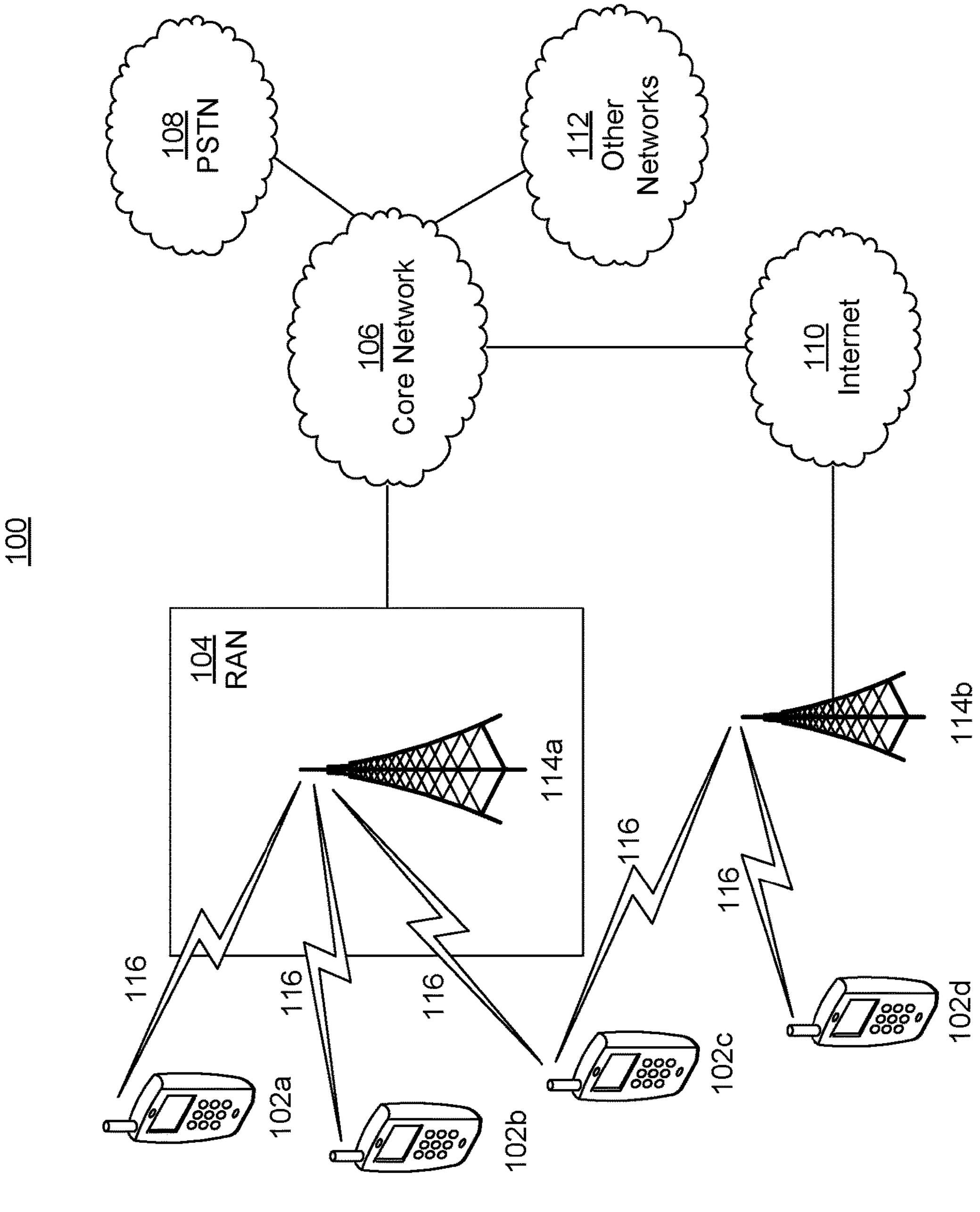
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c*, and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
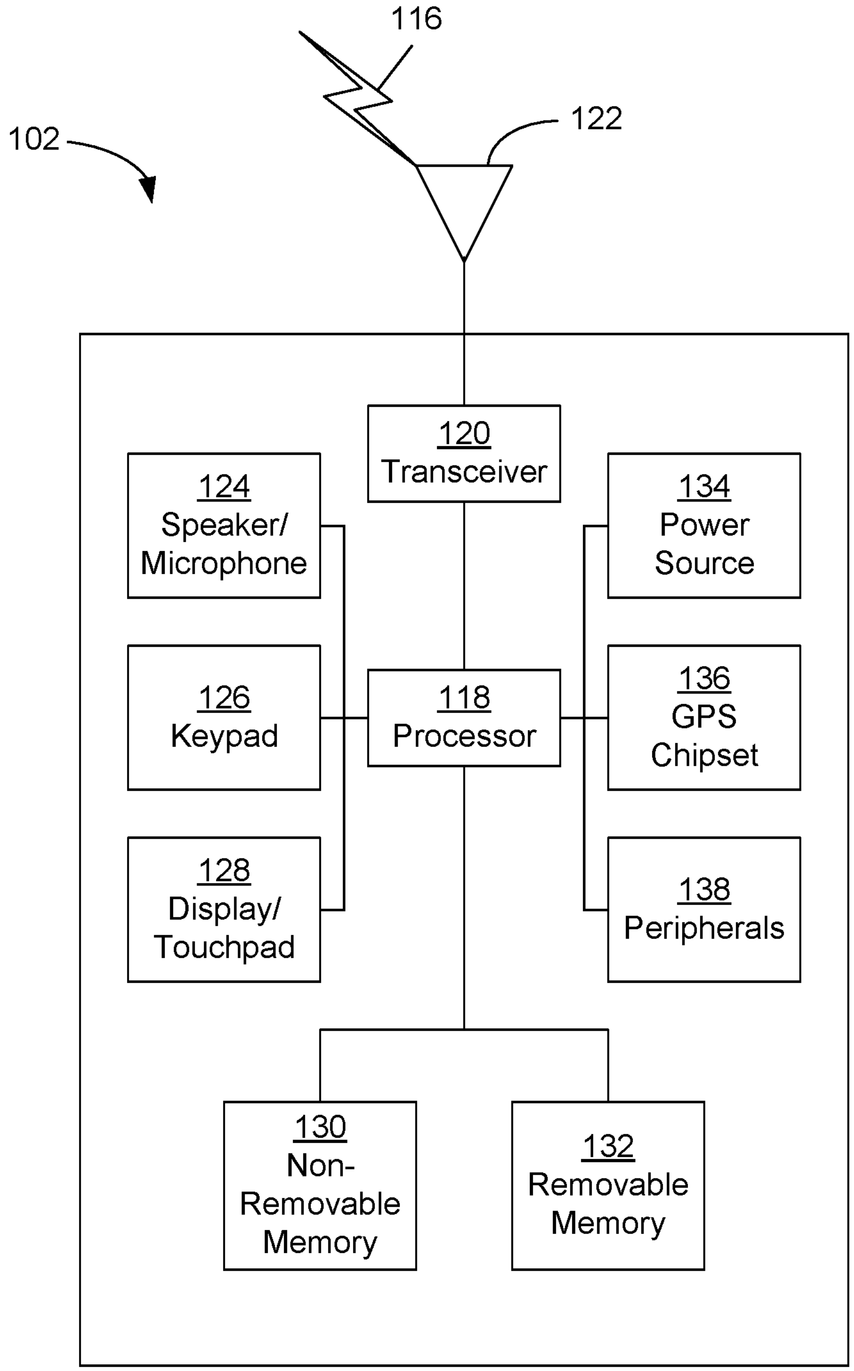
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
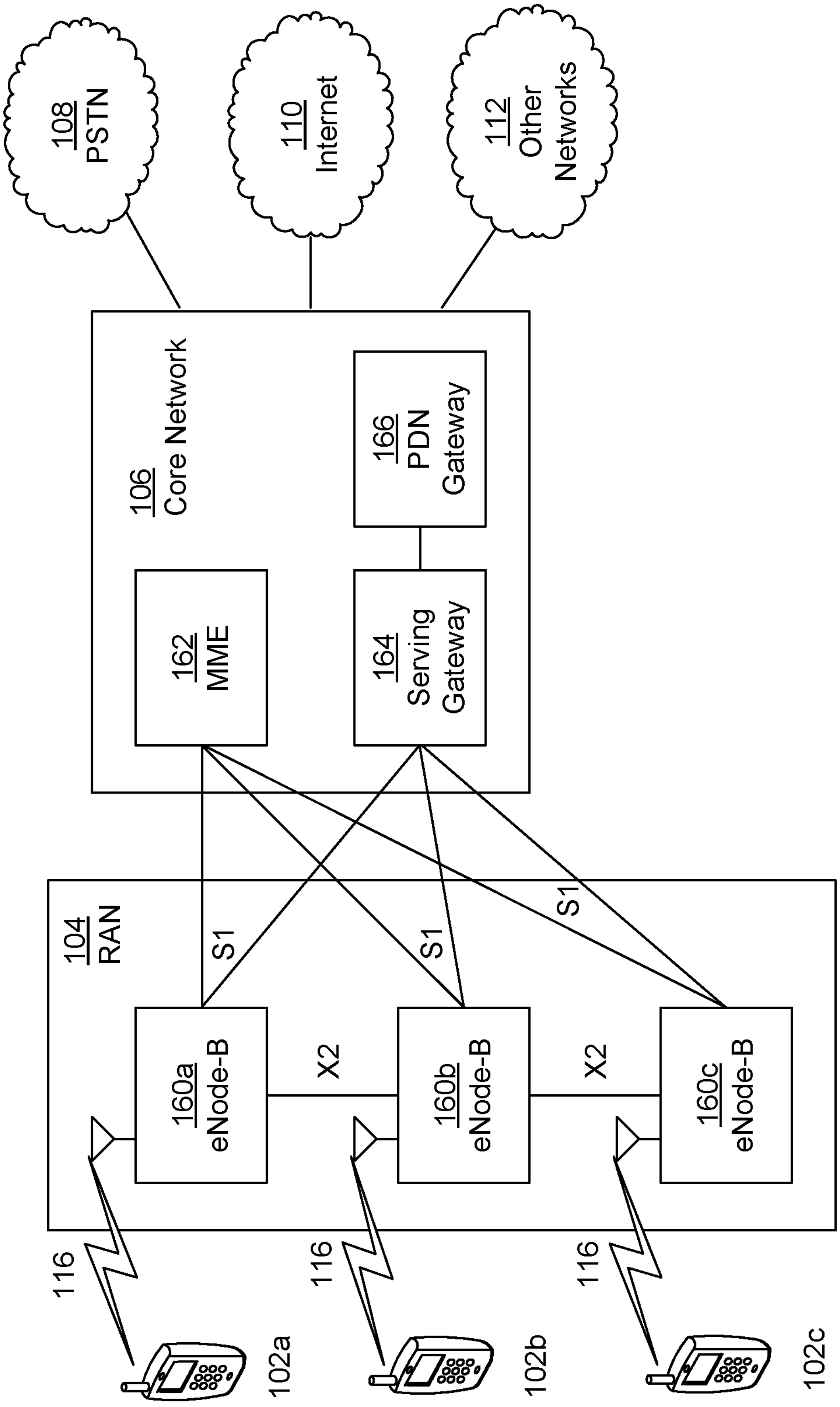
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
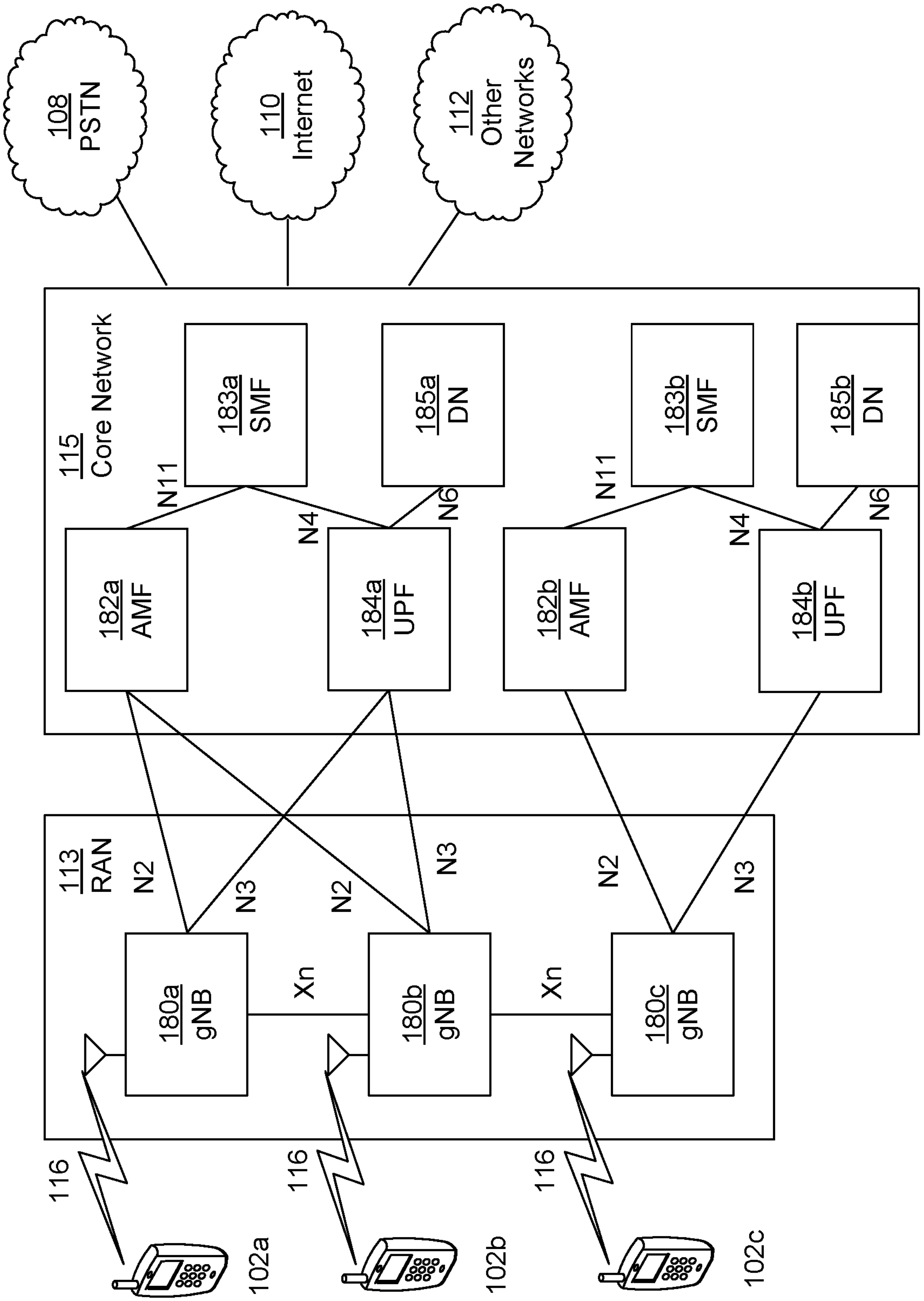
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein that are associated with the discovery of a personal Internet of Things (IoT) network (PIN). In examples, a PIN element (PINE) may discover PIN information by sending a solicitation request and/or receiving a solicitation response. In examples, a PINE may be a a wireless transmit/receive unit (WTRU). In examples, a PIN element may send an assistance discovery request message to a PIN gateway, a PIN element having PIN management capabilities, and/or other PIN elements. In examples, a PIN element may discover other PIN group members based on a group discovery policy. A PIN gateway may discover PIN group information and/or may provide the PIN group information to other PIN elements. A PIN element may be configured with one or more discovery restriction levels. A PIN element may provide PIN information to other PIN elements if the PIN information matches the discovery restriction levels configured for the other PIN elements. In examples, PIN elements may broadcast its reachability status, which may indicate that the PIN element may be accessed directly or via a PIN gateway (GW) or a PIN relay.

The format of the pin element (PINE) identity and the credential information to be configured in a PINE may be provided. The system (e.g., 5G system) may be enhanced so that a PINE with management capabilities (PEMC) may authenticate and/or authorize a PINE that has been provisioned with an identity and a credential. The system (e.g., 5GC) may be able to assist with an authentication and authorization procedure that is executed between a PEMC and PINE.

When a PINE is authenticated and/or authorized by the PEMC, the PINE may be able to communicate with a PINE with gateway capabilities (PEGC) of the PIN. The PEMC may assist the PEGC in authenticating and/or authorizing a PINE.

Systems, methods, and instrumentalities are described herein that are associated with the discovery of a personal Internet of Things (IoT) network (PIN). Discovery policy configuration information associated with a personal Internet of Things (IoT) network (PIN) may be determined. The discovery policy configuration information may comprise a PIN identification (ID). The discovery policy configuration information may indicate that discovery for the PIN is enabled. A first message may be sent to a second WTRU. For example, a first message may be sent to the second WTRU if discovery for the PIN is enabled. The first message may be based on the discovery policy configuration information. The first message may indicate the PIN ID. A second message may be received from the second WTRU. The second message may indicate the PIN ID and may indicate a request for information associated with the PIN. A third message may be sent to the second WTRU. The third message may indicate the PIN ID and may indicate the requested information associated with the PIN.

In an example, the discovery policy configuration information may comprise at least one of a discovery mode, a PIN information, and/or the PIN ID.

In an example, the requested information may comprise at least one of a list of one or more devices associated with the PIN, a PIN capability, a PIN availability, a PIN reachability, and/or a service associated with the PIN.

In an example, the discovery policy configuration information that may be associated with the PIN may be determined by receiving a fourth message from a third WTRU. The third WTRU may be at least one of a PIN gateway, a PIN element with management capabilities (PEMC), and/or a PIN element with gateway capabilities (PEGC).

In an example, a fifth message may be sent to the second WTRU. The fifth message may indicate a request to establish a connection between the first WTRU and the second WTRU.

Systems, methods, and instrumentalities are described herein that are associated with the discovery of a personal Internet of Things (IoT) network (PIN). Discovery policy configuration information associated with a personal Internet of Things (IoT) network (PIN) may be determined. The discovery policy configuration information may comprise a PIN identification (ID). The discovery policy configuration information may indicate that discovery for the PIN is enabled. A first message may be sent to a WTRU (e.g., another WTRU). For example, a first message may be sent to the WTRU if discovery for the PIN has been enabled. The first message may be based on the discovery policy configuration information. The first message may indicate the PIN ID. A second message may be received from the WTRU. The second message may indicate the PIN ID and may indicate a request for information associated with the PIN. A third message may be sent to the WTRU. The third message may indicate the PIN ID and may indicate the requested information associated with the PIN.

Systems, methods, and instrumentalities are described herein that are associated with the discovery of a personal Internet of Things (IoT) network (PIN). A solicitation request message may be received from a WTRU (e.g., another WTRU). The solicitation request message may indicate a personal Internet of Things network (PIN) identification (ID) that is associated with a PIN. The solicitation request message indicates a request for information that is associated with the PIN. A solicitation response message may be sent to the WTRU. The solicitation response message may indicate the PIN ID. The solicitation response message may indicate the requested information that is associated with the PIN. A request message may be received from the WTRU. The request message may be based on the requested information. The request message may indicate the PIN ID. The request message may indicate a WTRU ID that is associated with the WTRU. The request message may indicate a request to join the PIN. A response message may be received from the WTRU, for example, when the WTRU ID has been authenticated. The response message may indicate that the WTRU is authorized to join the PIN. The response message may indicate authorization information.

Systems, methods, and instrumentalities are described herein that are associated with the discovery of a personal Internet of Things (IoT) network (PIN). In an example, a first WTRU may be provided. The first WTRU may comprise a processor. The processor may be configured to perform one or more methods. A solicitation request message may be received from a second WTRU. The solicitation request message may indicate a personal Internet of Things network (PIN) identification (ID) that may be associated with a PIN. The solicitation request message indicates a request for information that may be associated with the PIN. A solicitation response message may be sent to the second WTRU. The solicitation response message may indicate the PIN ID. The solicitation response message may indicate the requested information that may be associated with the PIN. A request message may be received from the second WTRU. The request message may be based on the requested information. The request message may indicate the PIN ID. The request message may indicate a WTRU ID that may be associated with the second WTRU. The request message may indicate a request to join the PIN. A response message may be received from the second WTRU, for example, when the WTRU ID has been authenticated. The response message may indicate that the second WTRU is authorized to join the PIN. The response message may indicate authorization information.

In an example, an advertisement message may be sent to the second WTRU. The advertisement message may indicate the PIN that may be associated with the PIN.

In an example, a connection request message may be received. The connection request message may indicate that a request to establish a connection to the PIN based on the authorization information.

In an example, the WTRU ID may be authenticated. In an example, the WTRU ID may be authenticated by using the authentication information.

In an example, it may be determined that the second WTRU may be permitted to access a service.

PIN Element and PINE may be used interchangeably herein. A PINE may be a device that connects to a personal IoT network (PIN). PIN GW and PEGC may be used interchangeably herein. A PEGC may be a PINE that is capable of acting as a gateway in the PIN. PIN management and PEMC may be used interchangeably herein. A PEMC may be a PINE that is capable of acting as a management function in the PIN. A PEGC and a PIN GW may be used interchangeably herein. For example, functions that may be performed by a PEGC may be performed by a PEMC. As another example, functions that may be performed by a PEMC may be performed by a PEGC. A device may be both a PEGC and a PEMC (e.g., may include features of both PEGC and PEMC as described herein). For example, a PIN GW may be a PEGC and/or a PEMC. As another example, a WTRU may be a PIN GW, a PEGC, a PEMC, a combination thereof, and/or the like. A device such as a plain pin element (PINE), PINE with gateway capabilities (PEGC), and/or PINE with management capabilities (PEMC) may be linked to a WTRU subscription. Linking a device to a WTRU's subscription may mean that the WTRU's subscription is updated to indicate that a plain PINE may be associated with that WTRU within a PIN. For example, if the WTRU is a PEMC or a PEGC, linking may indicate that the device (e.g., PINE) may operate within the PIN that is served by the PEMC or PEGC.

As described herein, PINE may denote plain PINE (e.g., PINE that may not be aPEGC or PEMC). As disclosed herein, a wireless transmit/receive unit (WTRU) may be and/or may comprise a PINE, a PEGC, a PEMC, a combination thereof, and/or the like.

Figure 2:
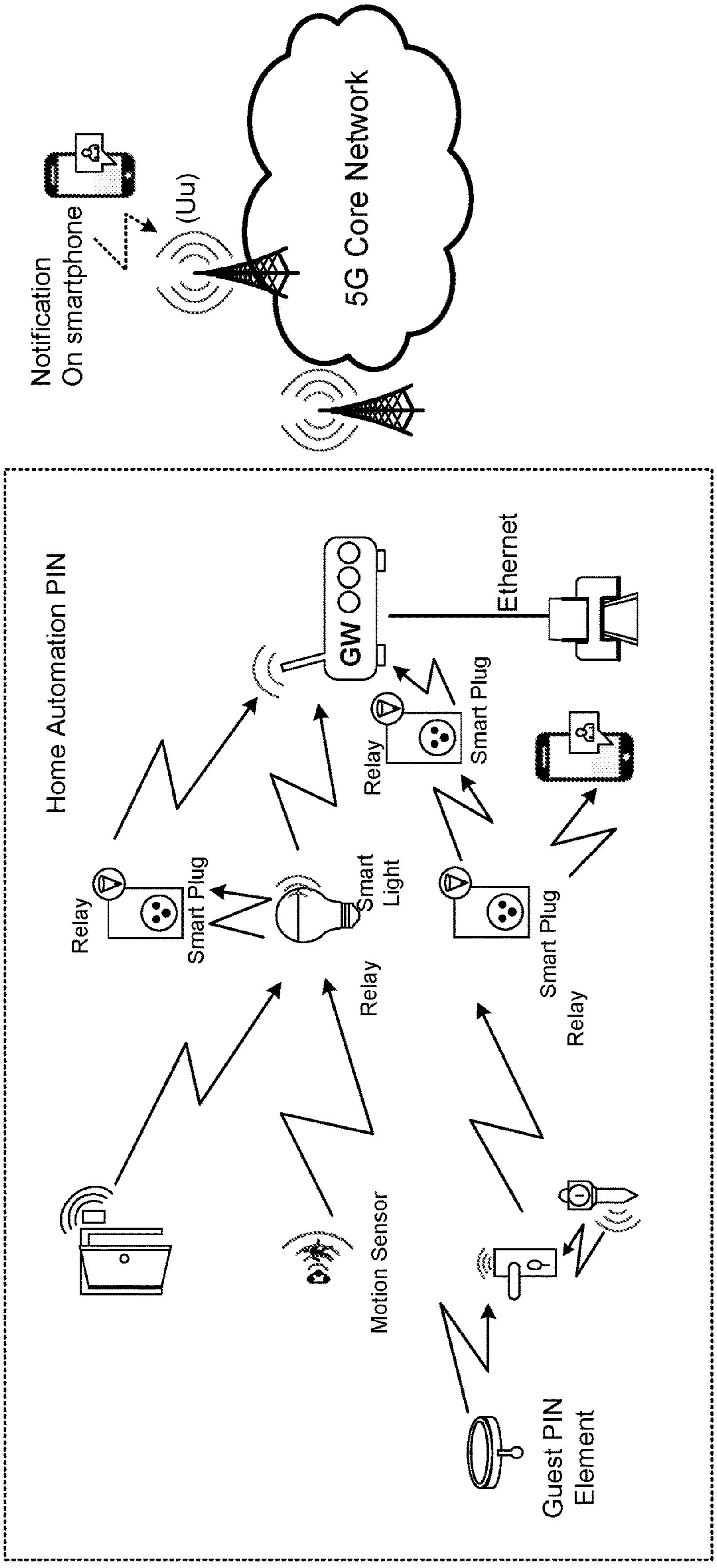
FIG. 2 is a diagram illustrating an example home PIN.

Multiple IoT devices (e.g., IoT capable WTRU) may be deployed in an environment such as a private environment. WTRUs with IoT capabilities may be organized as a PIN. For example, in a home environment, security sensors, smart lights, smart plugs, printers, cellphones, etc. may be managed by a residential gateway and may communicate with each other. One or more of these devices (e.g., all of these devices) may constitute a PIN. A device (e.g., each device, such as a WTRU) may be referred to as a PIN element, and different PIN elements may have different capabilities. For example, a residential gateway may be a PIN element with gateway capabilities (PIN GW) associated with providing connections between PIN elements and/or connections between a network (e.g., 5G network) and the PIN elements. The residential gateway may support (e.g., be configured to perform) one or more PIN management functions. FIG. 2 illustrates an example home PIN (e.g., a home automation PIN).

Figure 3:
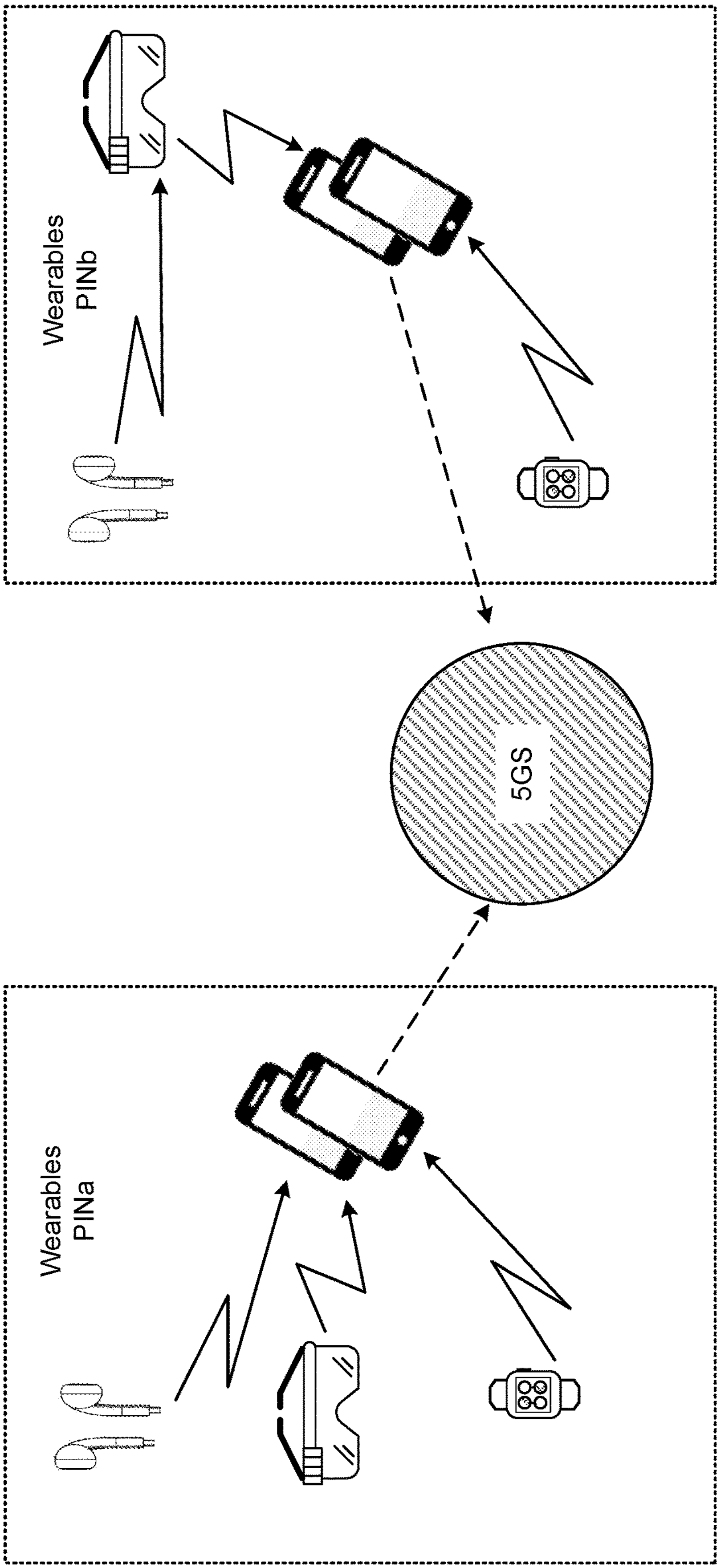
FIG. 3 is a diagram illustrating an example PIN comprising wearable devices.

One or more wearable devices (e.g., portable and/or attachable devices) may form a PIN. In an example, a wearable device may be a WTRU. In such a PIN, a WTRU (e.g., another WTRU, which may be a cellphone) may act as a PIN element with gateway capabilities and/or a PIN element with management capabilities. One or more PIN elements such as smart watches, virtual reality (VR)/augmented reality (AR) devices (e.g., VR/AR goggles or glasses), airpods, WTRUs, and/or the like may communicate with each other in the PIN (e.g., and/or with other WTRUs via a 5G network). FIG. 3 illustrates two example PINs comprising wearable devices in communication with each other via a 5G network.

Proximity services (ProSe) may be provided by a 3GPP system (e.g., a 5G network) based on WTRUs being within proximity of each other. A first WTRU may be configured to discover other WTRUs that may be in the proximity of the first WTRU, for example, through a ProSe discovery procedure. There may be multiple ProSe discovery modes (e.g., two ProSe discovery modes) such as model A and model B. In model A, a WTRU (e.g., an announcing WTRU) may broadcast an announcement message, for example, with a ProSe code. Such a ProSe code may be associated with, for example, an identifier of the announcing WTRU and/or a service provided by the announcing WTRU. Other WTRUs (e.g., monitoring WTRUs) that receive the announcement message may know that the announcing WTRU is in their proximity. In model B, a WTRU (e.g., a discoverer WTRU) may broadcast a solicitation request message, for example, with a ProSe query code. Such a ProSe query code may be associated with an identifier of a WTRU to be discovered and/or a ProSe service to be discovered. Other WTRUs (e.g., discoveree WTRUs) that receive the solicitation request message may respond to the request, for example, with a ProSe response code. Such a ProSe response code may be associated with an identifier of the discoveree WTRU and/or a ProSe service provided by the discoveree WTRU. The discoverer WTRU may, e.g., through the features described herein, know that one or more discoveree WTRUs are in its proximity.

One or more of the discovery modes (e.g., all of the discovery modes) described herein may be used to perform group discovery (e.g., to discover WTRUs that belong to a specific group), WTRU-to-network relay discovery (e.g., to discover a WTRU-to-network relay that provides connections to a 5G network), and/or the like. In examples (e.g., for group discovery), a discovery message (e.g., announcement message, solicitation request/response, etc.) may include a group ID. In examples (e.g., for WTRU-to-network relay discovery), a discovery message (e.g., announcement message, solicitation request/response, etc.) may use a relay service code (e.g., instead of the ProSe code described herein) to indicate a WTRU-to-network relay service.

Figure 4:
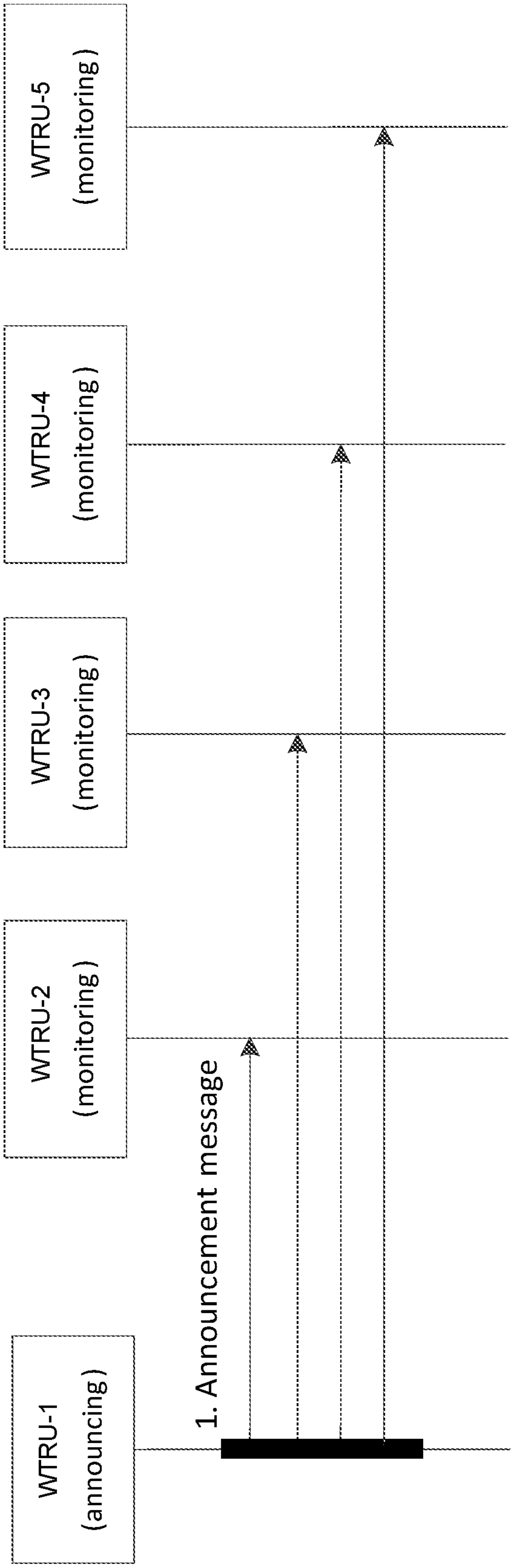
FIG. 4 is a diagram illustrating an example of ProSe direct discovery using a first discovery model (e.g., discovery model A described herein).
Figure 5:
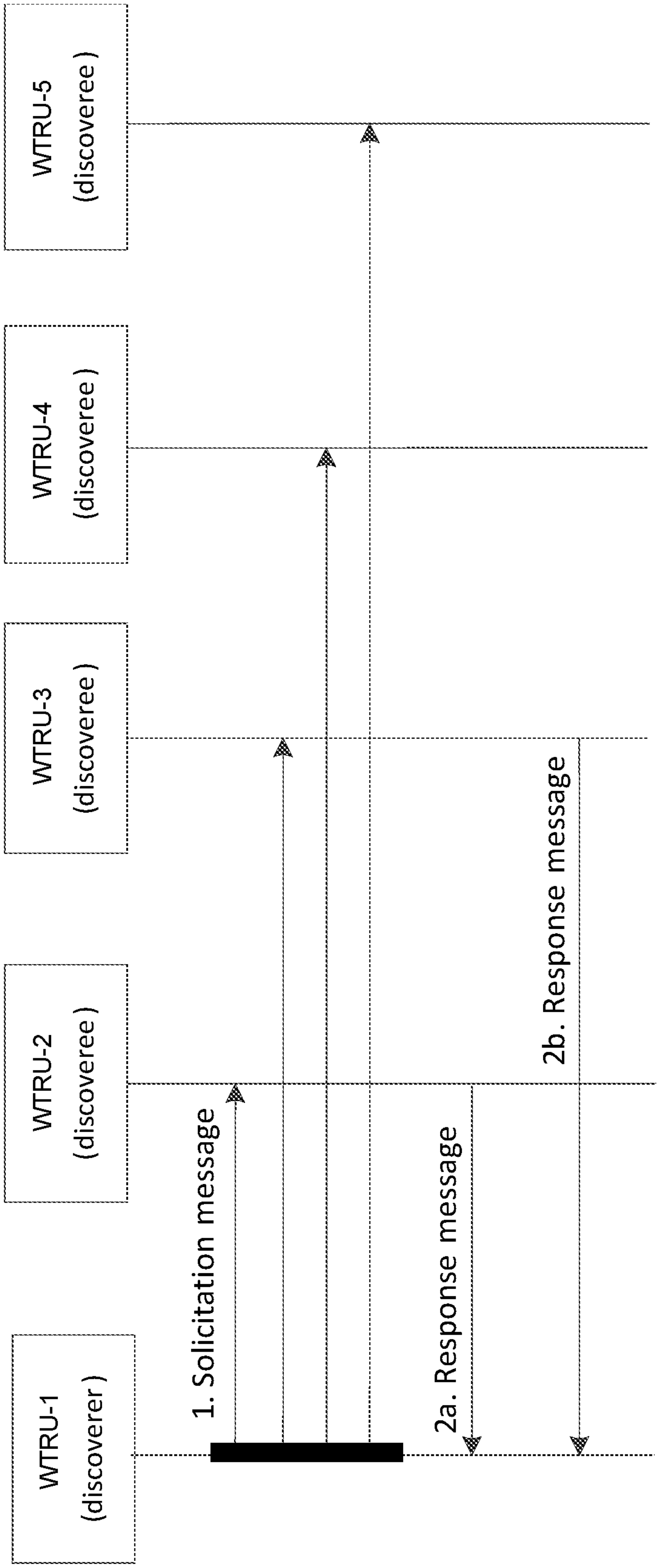
FIG. 5 is a diagram illustrating an example of ProSe direct discovery using a second discovery model (e.g., discovery model B described herein).

FIG. 4 illustrates an example of 5G ProSe discovery (e.g., direct discovery) using the discovery mode A described herein. FIG. 5 illustrates an example of 5G ProSe discovery (e.g., direct discovery) using the discovery mode B described herein.

Systems, methods, and instrumentalities described herein may be used to facilitate PIN discovery and/or PIN element discovery. In examples (e.g., for a home automation PIN), visitors and/or guests to a home who may have IoT devices (e.g., guest PIN elements) with them may join a home PIN (e.g., a home automation PIN) temporarily, for example, to play a video game using the visitors' own gaming devices (e.g., guest PIN elements). Before joining the PIN, a guest PIN element may discover the home PIN and/or one or more PIN elements in the home PIN. Proximity service discovery (e.g., based on the discovery model A and/or mode B described herein) may be used to discover peer nodes. In one or more PIN environments such as the home PIN described herein, a guest PIN element may be configured to discover available PIN information and/or PIN elements information. The PIN information may include, for example, a PIN identifier (ID), PIN topology, and/or status of the PIN (e.g., the number of PIN elements in the PIN) while the PIN element information may include, for example, a PIN element ID, PIN element capabilities (e.g., whether the PIN element is a gateway, management, or relay entity), the status of the PIN element (e.g., whether the PIN element is on or off), and/or the like.

One or more techniques described herein may be used to determine what type(s) of PIN information and/or PIN element information are to be discovered and/or to enable the discovery of such PIN and/or PIN element information.

Systems, methods, and instrumentalities described herein may be used to facilitate PIN element group discovery. In examples (e.g., to perform intra-PIN communication associated with home automation and/or to stream data such as voice, video, and/or gaming data), a PIN element may be configured to communicate with one or more other PIN elements (e.g., at the same time) and/or may be configured to discover the other PIN elements as individual elements or as a PIN element group before starting the communication. A PIN element group may be formed with respect to an application, for example, based on an application layer group ID. Such an application layer group ID may be provided by an application server and/or may be pre-configured or provisioned (e.g., by a network). In examples (e.g., in cases involving a PIN), a group size and/or member ID(s) may be known (e.g., obtained) via a PIN GW. Such information may be used for groupcast control.

Proximity-based group member discovery techniques may be used for PIN element group discovery. In examples (e.g., where a PIN environment is involved), a PIN element may be configured to discover available PIN group information such as a PIN application layer group ID, a PIN group size (e.g., number of PIN elements in the group), a PIN group ID, and/or the like. One or more techniques described herein may enable the discovery of PIN element group information, for example, when a PIN GW does not allow PIN group members to directly discover each other or when the PIN GW allows PIN group members to directly discover each other.

Privacy issues associated with PIN discovery, PIN element discovery, and/or PIN element group discovery may be addressed. These privacy issues may arise for a PIN owner, for example, when a guest PIN element performs a discovery procedure with the PIN. The privacy issues may include ensuring that PIN information and/or PIN element information may not be discovered by unauthorized guest PIN elements, security sensors may not be discovered by a guest PIN element (e.g., even if the guest PIN element is authorized to discover a printer in the PIN), and/or the like. One or more techniques described herein may be used to control the performance of PIN discovery and/or PIN element discovery based on privacy policies (e.g., allow different discovery operations to be performed with regard to PIN information and/or PIN element information based on different privacy policies).

Discovery of availability and/or reachability of PIN element may be provided. In examples, if a guest PIN element performs the discovery procedure to discover a PIN element, the guest PIN may be interested in the availability and/or reachability of the PIN element. For example, the guest PIN may be interested in which time window the PIN element may be accessed and/or may be interested in which data path the PIN element may be accessed. Enabling a guest PIN element to discover a PIN element's availability and/or reachability may be provided.

Authentication and authorization of PINEs may be provided. A PINE may be pre-configured and/or on-boarded with credentials and/or identity (e.g., a PINE ID). The credentials and/or PINE ID may be provisioned on a server, network function, and/or repository that is controlled by a mobile network operator (MNO). The PINE may be placed in close proximity to PEMC which manages PIN. The PINE may be turned on and may discover the PEMC and a PINE authentication and authorization procedure may be initiated. The PEMC may determine whether the PINE is authenticated and/or whether the PINE is authorized to join the PIN. Once the PINE joins the PIN, the PINE may establish communication with a PEGC and may communicate with other devices within the PIN.

The PEMC and the PEGC may be one or more WTRUs. For communication between a PINE and a PEMC or PEGC, a PC5 may be used. In examples, other interfaces between a PINE and a PEMC, PEGC, and/or a PIN GW may be used. Communication between a PINE and a PEMC, PEGC, and/or a PIN GW may be carried by a protocol (e.g., non-3GPP protocol) such as Bluetooth or WiFi. In an example, security may be provided by a PIN application laywer and may not be provided by Bluetooth and/or WiFi (e.g., confidentiality, integrity, and/or replay protection).

The format of the PINE identity and/or the credential information to be configured (e.g., may need to be configured) in a PINE may be provided. The system (e.g., 5G system) may be enhanced so that a PEMC may authenticate and/or authorize a PINE that has been provisioned with an identity and/or a credential. The system (e.g., 5GC) may be able to assist with an authentication and/or authorization procedure that is executed between a PEMC and PINE.

If a PINE is authenticated and authorized by the PEMC, the PINE may be able to communicate with a PEGC of the PIN. The PEMC may assist the PEGC in authenticating and/or authorizing a PINE.

Examples described herein may be used for a customer premises network. The PIN GW (which may be a PEMC and/or PEGC) may be replaced by evolved residential gateway and the guest PIN element/PIN element may be replaced by WTRUs.

In examples, a PIN element (e.g., a PIN GW or a PIN element with management capabilities) may transmit (e.g., broadcast) an announcement message, which may include an identifier of a PIN. A guest PIN element may discover the PIN in response to receiving the announcement message. The guest PIN element may decide to discover information (e.g., additional information) about the PIN and may send a request (e.g., a solicitation request) to one or more other PIN elements in the PIN. The request may include information such as a PIN identifier and/or other PIN information to be discovered. Such PIN information may indicate, for example, one or more PIN elements with capabilities (e.g., specific capabilities), a PIN topology, one or more PIN services, and/or the like. A PIN element that matches the PIN information comprised in the request may send a response (e.g., a solicitation response), for example, with the PIN information requested by the guest PIN element. For example, if a guest PIN element decides to discover PIN elements with relay capabilities, the guest PIN element may include a relay capability indication in the PIN information to be discovered. In examples, if the guest PIN element decides to discover PIN elements providing PIN services (e.g., specific PIN services), the guest PIN element may include a PIN service description and/or service ID in the PIN information to be discovered.

A PIN GW (e.g., PIN element with management capabilities, a PEMC, a PEGC, and/or a combination thereof) may configure one or more PIN discovery policies for other PIN elements. The one or more PIN discovery policies may include an indication of whether discovery is enabled or disabled, an indication of a discovery mode, an indication of a PIN identifier, and/or the like. PIN elements may perform a discovery procedure based on the one or more PIN discovery policies. Different PIN elements may be configured with different PIN discovery policies.

The announcement message described herein may be broadcasted by one or more PIN elements (e.g., all PIN elements) of a PIN or may be broadcasted by a PIN GW or a PIN element with management capabilities based on a discovery policy.

The announcement, solicitation request, and/or solicitation response messages described herein may include a PIN element identifier and/or a guest PIN element identifier.

A guest PIN element may be configured with one or more of the following behaviors. The guest PIN element may receive an announcement message, which may include a PIN identifier. The guest PIN element may decide to discover the PIN information of a PIN based on a local policy. The guest PIN element may send a solicitation request, which may include a PIN identifier and/or PIN information to be discovered. The guest PIN element may receive a solicitation response, which may include a PIN identifier and/or PIN information to be discovered.

A PIN element may be configured with one or more of the following behaviors. The PIN element may receive discovery policy configuration information, which may indicate whether discovery is enabled or disabled, a discovery mode to be used, a PIN identifier to be used (e.g., in a discovery message), and/or the like. The PIN element may broadcast an announcement message, for example, based on a discovery policy. The PIN element may receive a solicitation request and/or may determine whether the PIN element matches the PIN information comprised in the solicitation request. The PIN element may send a solicitation response with the PIN information requested by a solicitation request message.

A PIN GW (e.g., PIN element with management capabilities, a PEMC, a PEGC, and/or a combination thereof) may be configured with one or more of the following behaviors. The PIN GW may send discovery policy configuration information, which may indicate whether discovery is enabled or disabled, a discovery mode to be used, a PIN identifier to be used (e.g., in a discovery message), and/or the like. The PIN GW may broadcast an announcement message, for example, based on a discovery policy. The PIN GW may receive a solicitation request and/or may determine whether the PIN element matches the PIN information to be discovered (e.g., the PIN information comprised in the solicitation request). The PIN GW may send a solicitation response with the PIN information requested by the solicitation request message.

Figure 6:
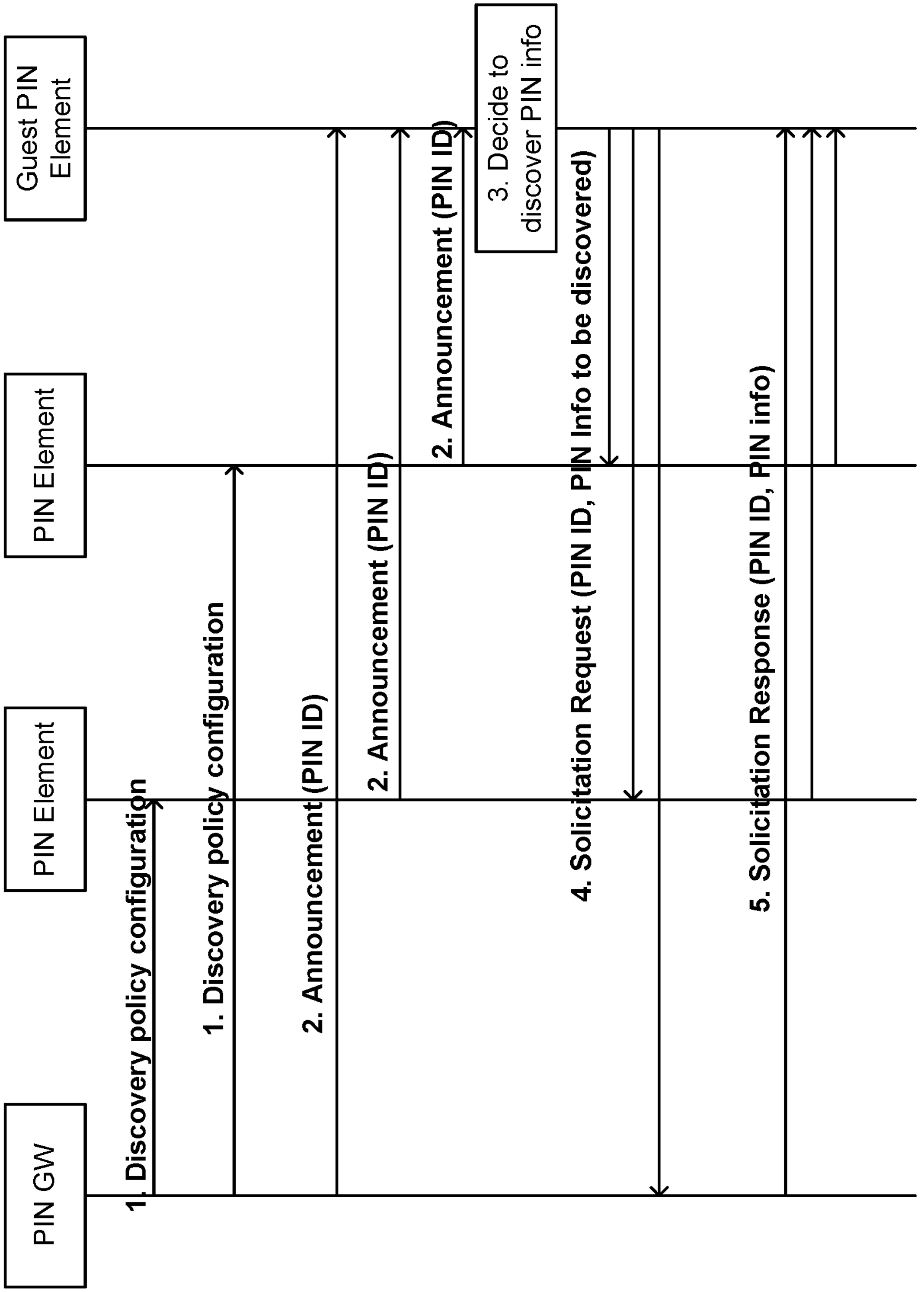
FIG. 6 is a diagram illustrating an example of PIN discovery.

FIG. 6 illustrates an example PIN discovery procedure. At 1, a PIN GW (e.g., or a PIN element with PIN management capabilities) may send discovery policy configuration information to one or more PIN elements (e.g., different PIN elements may be configured with different discovery policies). The configuration information may indicate whether discovery is enabled or disabled, a discovery mode to be used, a PIN identifier to be used (e.g., in a discovery message), and/or the like. At 2, the PIN GW may broadcast an announcement message, which may include a PIN identifier. At 3 (e.g., after discovering the PIN), a guest PIN element may decide to discover PIN information associated with the PIN. At 4, the guest PIN element may send a solicitation request, which may include a PIN identifier and/or PIN information to be discovered. At 5, a PIN element that matches the PIN information to be discovered may send a solicitation response, for example, with the PIN information requested by the guest PIN element.

In examples, the discovery model A (e.g., only discovery model A) described herein may be used for PIN discovery. A PIN element may broadcast an announcement message, which may include a PIN identifier and/or other PIN information such as the PIN element's capabilities, PIN topologies, PIN service(s) provided by the PIN element, etc. A guest PIN element may monitor the announcement message. A PIN GW (e.g., PIN element with management capabilities, a PEMC, a PEGC, and/or a combination thereof) may configure a PIN discovery policy for one or more PIN elements in the PIN (e.g., different PIN elements may be configured with different discovery policies). The announcement message may be broadcasted by one or more PIN elements (e.g., all PIN elements) in a PIN or by a PIN GW (e.g., e.g., PIN element with management capabilities, a PEMC, a PEGC, and/or a combination thereof), for example, based on a discovery policy. In examples, the announcement message may include a PIN element identifier. In examples, a PIN element may be configured with one or more of the following behaviors. The PIN element may receive discovery policy configuration information (e.g., different PIN elements may be configured with different discovery policies), which may indicate whether discovery is enabled or disabled, a discovery mode to be used, a PIN identifier to be used (e.g., in a discovery message), and/or the like. The PIN element may broadcast an announcement message based on a discovery policy. The announcement message may include PIN information.

In examples, the discovery model B (e.g., only discovery model B) described herein may be used for PIN discovery.

A guest PIN element may send a solicitation request, which may include a PIN identifier. A PIN element that receives the solicitation request may send a solicitation response, which may include a PIN identifier and/or other PIN information. A PIN GW (e.g., PIN element with management capabilities, a PEMC, a PEGC, and/or a combination thereof) may configure a PIN discovery policy for one or more PIN elements in the PIN (e.g., different PIN elements may be configured with different discovery policies). A PIN element may decide to respond to a solicitation request based on a discovery policy. A solicitation request and/or response message may include a PIN element identifier and/or a guest PIN element identifier. A PIN element may be configured with one or more of the following behaviors. The PIN element may receive discovery policy configuration information (e.g., different PIN elements may receive different discovery policy configuration information), which may indicate whether discovery is enabled or disabled, a discovery mode to be used, a PIN identifier to be used in a discovery message, and/or the like. The PIN element may receive a solicitation request (e.g., which may include PIN information to be discovered) and may determine whether the PIN element matches the PIN information to be discovered. The PIN element may send a solicitation response with PIN information.

In examples, the PIN element (e.g., PIN GW, a PIN element with management capabilities, a PEMC, a PEGC, and/or a combination thereof) may broadcast an announcement message, which may include the PIN's ID and/or information that PIN element(s) are not discoverable without authorization or discoverable via PIN GW (e.g., discoverable via a communication with a PIN GW). A guest PIN element may discover the PIN GW, for example, after receiving the announcement message. A guest PIN element may be allowed (e.g., may only be allowed) to communicate with the PIN GW. Other PIN elements may be configured with a discovery policy by the PIN GW in such a way that they are disabled to be discovered directly via the guest PIN element. The guest PIN element may send a solicitation request to the PIN GW, for example, which may include the PIN ID of the PIN GW and/or PIN information to be discovered (e.g., a PIN element with a specific capability, PIN topologies, PIN service, etc.).

The PIN GW (e.g., PIN element with management capabilities, a PEMC, a PEGC, and/or a combination thereof) may gather the requested PIN information, for example, via communicating with the PIN elements (e.g., via solicitation request/response) within the PIN. In examples, if the PIN GW has gathered the information, it may send a solicitation response back to the guest PIN element. The PIN GW may enable discovery of the respective PIN element so that it may be discovered by the guest PIN.

The guest PIN element's behavior may include one or more of the following: receives the announcement message, which includes PIN ID; decides to discover PIN information of a PIN based on local policy; sends a solicitation request, which includes PIN ID and/or PIN information to be discovered; or receives a solicitation response, which includes PIN ID and/or PIN information to be discovered.

The PIN element's behavior may include one or more of the following: receives a discovery policy configuration, which includes enabling or disabling discovery, discovery mode, PIN ID used in discovery message, and/or the like; receives a solicitation request and determines whether the PIN element matches the PIN information to be discovered and/or PIN ID; or sends a solicitation response with PIN information requested by the solicitation request message.

The PIN GW behavior (which may be a PIN element with management capabilities, a PEMC, a PEGC, and/or a combination thereof) may include one or more of the following: sends a discovery policy configuration, which includes enabling or disabling discovery, discovery mode, PIN ID used in discovery message, and/or the like; broadcasts an announcement message based on discovery policy; receives a solicitation request and determines whether the PIN element matches the PIN information to be discovered; or sends a solicitation response with PIN information.

Figure 7:
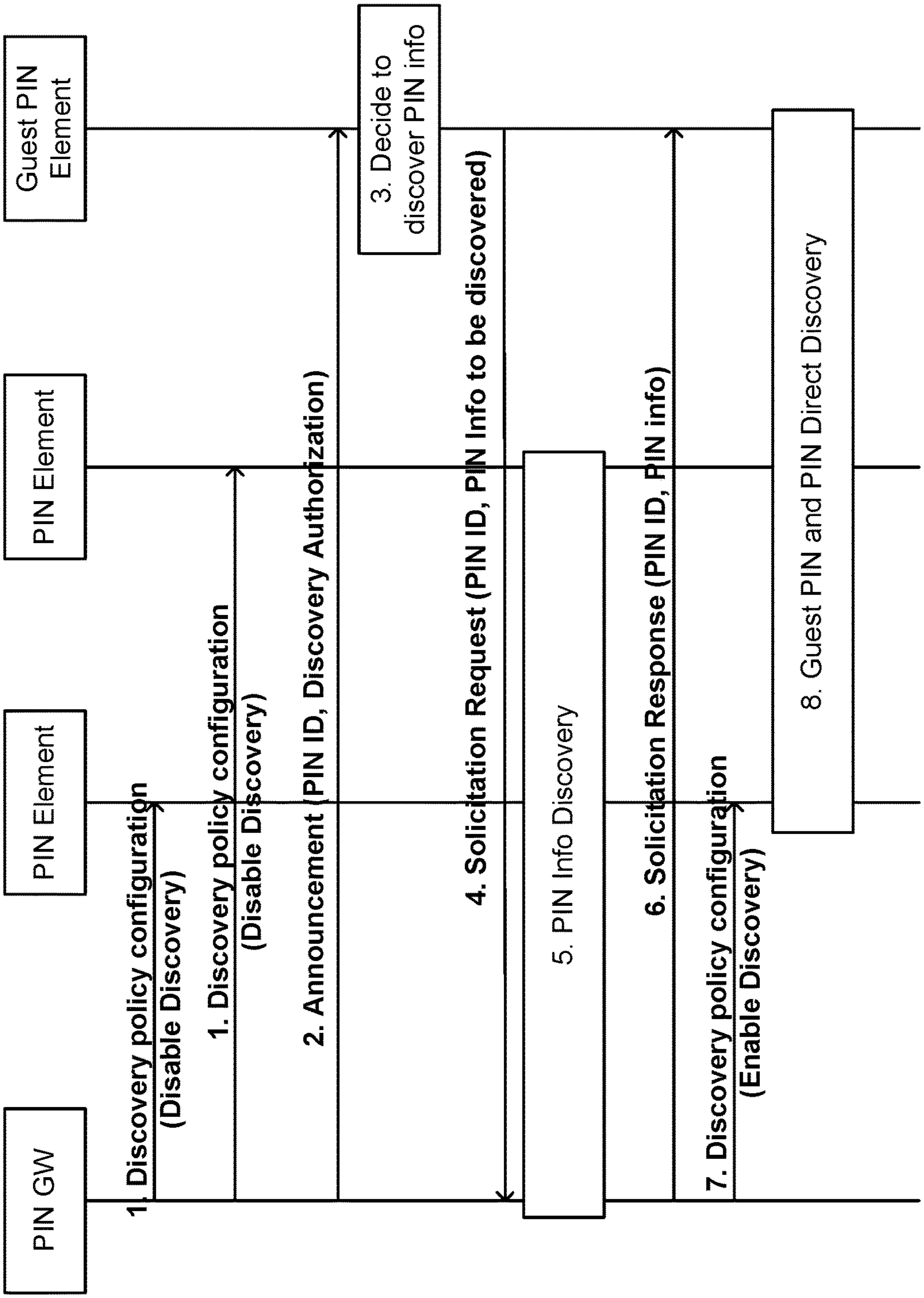
FIG. 7 is a diagram illustrating an example of PIN discovery.

FIG. 7 is a diagram illustrating an example of PIN discovery. The PIN GW (e.g., PIN element with management capabilities, a PEMC, a PEGC, and/or a combination thereof) may send a discovery policy configuration to PIN element(s), for example, which may disable discovery for the PIN element(s) by guest PIN elements. The PIN GW may broadcast an announcement message, which may include a PIN ID of the PIN GW and an indication that PIN discovery is not allowed without authorization or discovery via PIN GW only. After discovering the PIN GW, the guest PIN element may decide to discover the PIN information. The guest PIN element may send a solicitation request, which may include the PIN ID and/or PIN information to be discovered. PIN GW may discover the requested PIN information from the guest PIN within the PIN via a solicitation request and/or response. The PIN GW may respond back to the guest PIN with the PIN ID of the target PIN element along with the PIN Information. The PIN GW may enable the discovery on the target PIN element, for example, so that it may be discovered by the guest PIN. The guest PIN may have the information (e.g., all the required information) to discover the target PIN element and a discovery procedure (e.g., described herein) may follow.

A PIN element may be configured to discover a PIN element group. Such a PIN element group may be formed by an application (e.g., an application layer of one or more PIN elements) and/or may be pre-configured or provisioned by a network. In the latter case, the group size and/or members (e.g., member IDs) of the group may be known (e.g., configured by the network). A PIN element may be configured to perform group discovery in multiple ways (e.g., two ways). For example, the PIN element may send an assistance request to a PIN GW to discover one or more group members, for example, if a PIN GW does not allow (e.g., based on a configured policy) a PIN element to directly discover other group members whether they are nearby or far away. For example, the PIN element may send a group member discovery solicitation message if direct discovery of group members is not restricted by a PIN GW.

Figure 8:
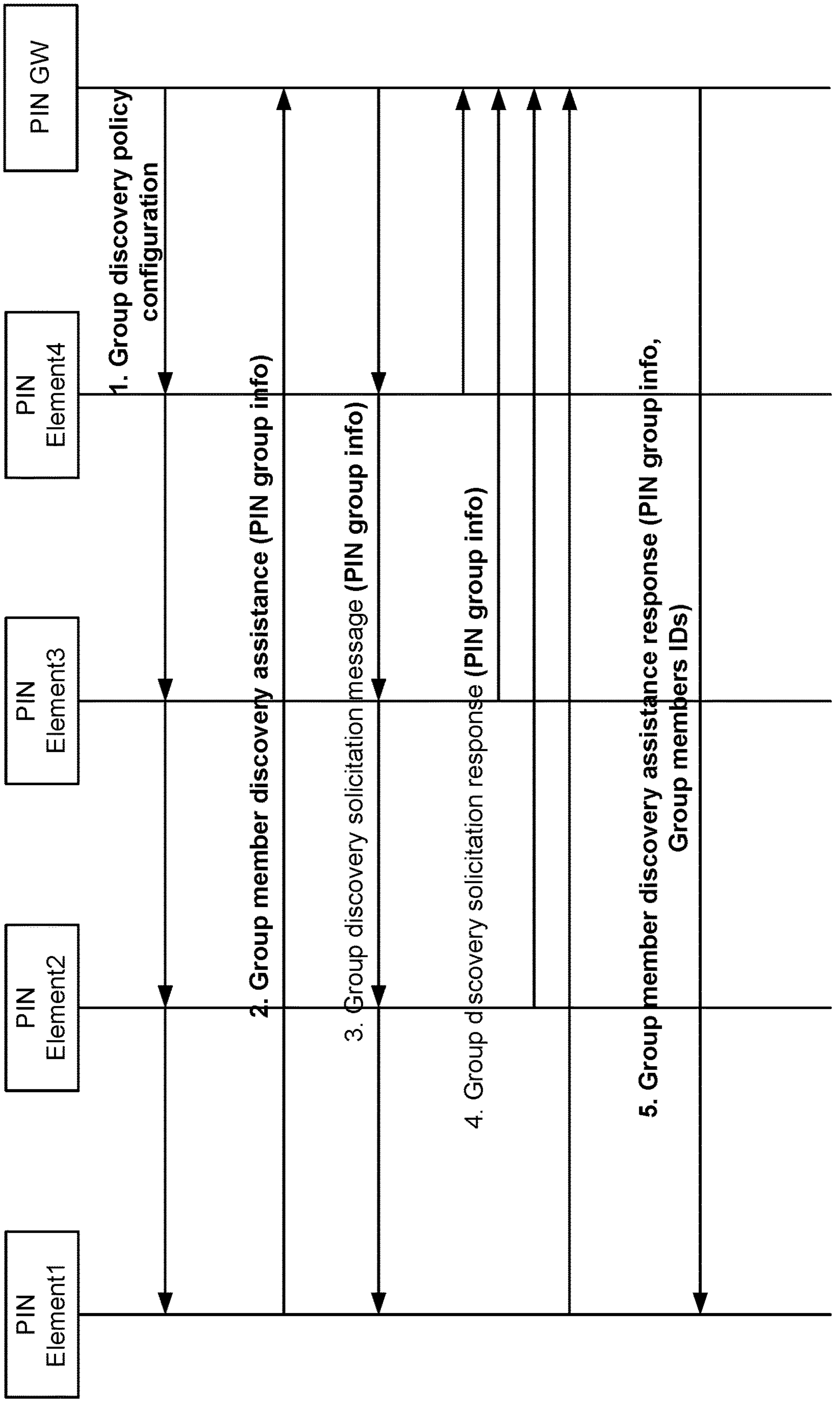
FIG. 8 is a diagram illustrating an example of PIN element group discovery.

FIG. 8 illustrates an example of discovering a PIN element group when direct discovery of PIN elements is not allowed. As shown, a group of 4 PIN elements may be associated to a PIN GW (e.g., PIN element with management capabilities, a PEMC, a PEGC, and/or a combination thereof). One of the PIN elements may be interested in discovering the other group members for groupcast communication. The PIN GW may not allow (e.g., based on a configured policy) PIN group members to directly discover each other. In such a case, a PIN element may be configured with one or more of the following behaviors. The PIN element may receive a group discovery policy configuration, which may indicate whether direct (e.g., or indirect) group discovery is enabled or disabled, a discovery mode to be used, a PIN identifier, a PIN group identifier, a PIN application identifier (e.g., an application ID associated with the PIN group), a group size, and/or the like. In examples (e.g., for indirect discovery), the PIN element may send an assistance discovery request message to a PIN GW (e.g., PIN element with management capabilities, a PEMC, a PEGC, and/or a combination thereof), for example, to discover group members based on a group discovery policy. The PIN element may receive a solicitation request comprising PIN group information (e.g., to be discovered) and may determine whether the PIN element matches the PIN group information to be discovered. The PIN element may send a solicitation response, which may include PIN group information. The PIN element may receive a group discovery announcement message, which may include PIN group information. In examples (e.g., for indirect discovery), the PIN element may receive an assistance discovery response message from a PIN GW (e.g., or a PIN element having management capabilities) with the group information.

The PIN GW may be configured with one or more of the following behaviors. The PIN GW may send group discovery policy configuration information, which may indicate whether direct (e.g., or indirect) group discovery is enabled or disabled, a discovery mode to be used, a PIN identifier to be used, a PIN group identifier to be used, a PIN application identifier (e.g., an application ID associated with the PIN group), a group size, and/or the like. The PIN GW may send a group discovery solicitation request and/or may determine whether a PIN element matches PIN group information to be discovered. The PIN GW may receive a group discovery solicitation response, which may include the PIN group information. The PIN GW may receive a group member discovery assistance request message from a PIN element, which may include the PIN group information. The PIN GW may send an assistance response message to the PIN element and may include the PIN group information and/or group members IDs in the response.

As shown in FIG. 7, at 1, the PIN GW may send group discovery policy configuration information to one or more PIN elements (e.g., all PIN elements). The configuration information may include an indication of whether direct (e.g., or indirect) discovery member discovery is enabled or disabled, a discovery mode to be used, a PIN identifier, a PIN group identifier, a PIN application identifier (e.g., an application ID associated with the PIN group), a group size, and/or the like. At 2, PIN Element1, which may be interested in discovering other group members, may send an assistance message to the PIN GW. The assistance message may include, for example, PIN group information (e.g., PIN group information being discovered). At 3 (e.g., after receiving the assistance request), the PIN GW may broadcast a discovery solicitation request message. At 4, one or more PIN elements may receive the discovery solicitation message, which may include PIN group information. A PIN element trying to discover matching PIN group information may send a solicitation response to the PIN GW, which may include the matching PIN group information. At 5, the PIN GW may send a discovery assistance response to PIN element1, confirming the presence of PIN group members.

Figure 9:
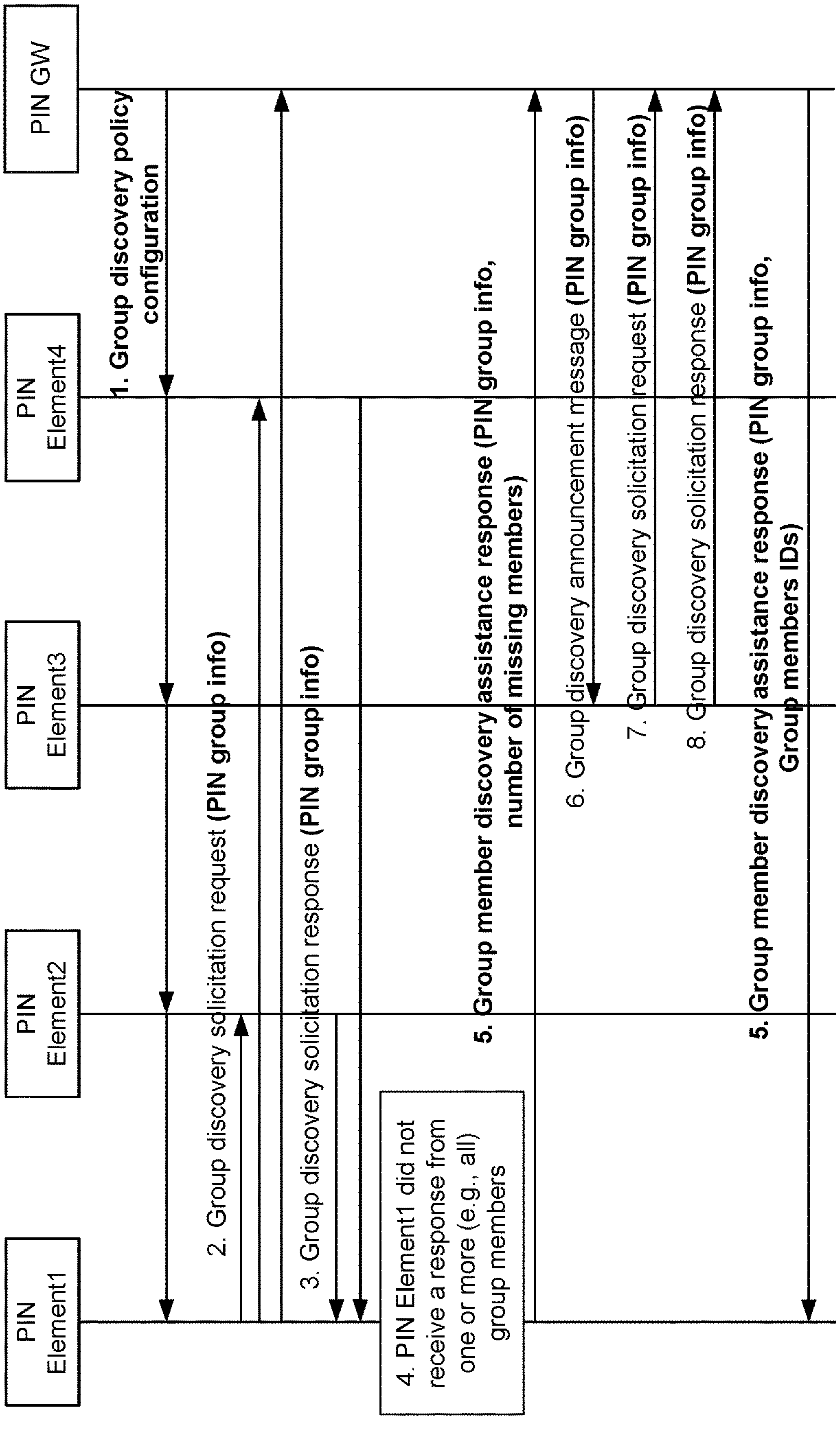
FIG. 9 is a diagram illustrating another example of PIN element group discovery.

FIG. 9 illustrates an example of discovering a PIN element group when direct discovery of PIN elements may be allowed. As shown, a group of 4 PIN elements may be associated with a PIN GW (e.g., PIN element with management capabilities, a PEMC, a PEGC, and/or a combination thereof). One or more of the PIN elements may be interested in discovering the other group members, for example, for groupcast communication. A policy may be pre-configured to allow PIN group members discover each other, for example, if they may be close enough to send or receive discovery messages to or from each other. The PIN GW may assist with the discovery if a group member (e.g., any of the group members) are not reachable directly.

A PIN element may be configured with one or more of the following behaviors. The PIN element may receive group discovery policy configuration information, which may include an indication of whether direct (e.g., or indirect) group discovery is enabled or disabled, a discovery mode to be used, a PIN identifier, a PIN group identifier, a PIN application identifier (e.g., an application ID associated with the PIN group), a group size, and/or the like. In examples (e.g., for direct discovery), the PIN element may broadcast a group discovery solicitation message based on a group discovery policy. The PIN element may send and/or receive a solicitation request, which may include PIN group information (e.g., PIN group information being discovered) and may determine whether the PIN element matches the PIN information being discovered. The PIN element may send and/or receive a solicitation response with PIN group information. The PIN element may receive a group discovery announcement message with PIN group information. The PIN element may receive an assistance discovery response message, for example, from the PIN GW. The assistance discovery response message may include PIN group information and/or group members that can or cannot be discovered directly by a discoverer PIN element.

The PIN GW may be configured with one or more of the following behaviors. The PIN GW may send group discovery policy configuration information, which may include an indication of whether direct (e.g., or indirect) group discovery is enabled or disabled, a discovery mode, a PIN identifier, a PIN group identifier, a PIN application ID (e.g., an application ID associated with the PIN group), a group size, and/or the like. The PIN GW may broadcast a group discovery announcement message, for example, based on a discovery policy. The PIN GW may receive a solicitation request and may determine whether a PIN element matches the PIN group information being discovered. The PIN GW may send a solicitation response, which may include PIN group information. The PIN GW may receive an assistance request message from a PIN element, which may include PIN group information. The PIN GW may send an assistance response message to a PIN element with PIN group information and/or group members identifiers.

As shown in FIG. 9, at 1, the PIN GW (e.g., PIN element with management capabilities, a PEMC, a PEGC, and/or a combination thereof) may send group discovery policy configuration information to one or more PIN elements (e.g., all the PIN elements). The configuration information may include an indication of whether group discovery is enabled or disabled, a discovery mode to be used, a PIN identifier, a PIN group identifier, a PIN application identifier (e.g., an application ID associated with the PIN group), a group size, and/or the like. At 2, a PIN element (e.g., a discoverer PIN element) that is interested in discovering a PIN element group (e.g., offering a specific service or having a specific group ID) may broadcast a group discovery solicitation request message. The request message may include a group ID and/or an application ID (e.g., an application ID associated with the PIN group). At 3 (e.g., after receiving the solicitation request from the discoverer PIN element), a discoveree PIN element that belongs to the group may respond with a solicitation response. The response may include information associated with the PIN group. At 4, the discoverer PIN element (e.g., PIN element1) may decide that it did not receive a response from one or more group members (e.g., all the group members) of the PIN group. In response, the discoverer PIN element may, at 5, send a member discovery assistance message to the PIN GW. The assistance message may include, for example, PIN group info and/or the number of missing members. At 6, the PIN GW may broadcast a discovery announcement message. At 7, one or more of the PIN elements that did not respond earlier to the solicitation request message from PIN element1 may send a discovery solicitation request message to the PIN GW. At 8, the PIN GW may respond to the solicitation request message with detailed PIN group information. At 9, the PIN GW may send a discovery assistance response to the discoverer PIN element (e.g., PIN element1 in this case), confirming the presence of PIN group members.

Restrictions may be imposed with regard to PIN discovery and/or PIN element discovery. In examples, one or more PIN elements (e.g., all PIN elements) may be configured with a discovery policy, which may specify one or more discovery restriction levels. A guest PIN element that decides to discover PIN information may retrieve the discovery policy of the PIN, for example, from a PIN GW (e.g., or other PIN element(s) with PIN management capabilities). The guest PIN element may send a solicitation request, which may include a PIN identifier and/or a discovery restriction level. A PIN element that receives the solicitation request may determine (e.g., check) whether the guest PIN element is authorized to discover PIN information based on the discovery restriction level and/or one or more corresponding security parameters. The PIN element may send a solicitation response with a PIN identifier and/or other PIN information.

The discovery restriction level(s) may be configured with a set (e.g., respective sets) of security parameters. A token may be generated based on one or more security parameters associated with a security level and/or may be sent with the discovery restriction level. A receiver of the token and/or discovery restriction level may check whether the discovery restriction level is misused in the discovery message, for example, by checking the token based on the corresponding security parameters.

In examples, instead of sending a solicitation response after receiving a solicitation request, the PIN element may broadcast the announcement message, which may include discovery restriction level(s).

A guest PIN element may establish a secure connection with the PIN GW (e.g., e.g., PIN element with management capabilities, a PEMC, a PEGC, and/or a combination thereof) before receiving discovery policy configuration information from the PIN GW.

The discovery restriction level(s) may be defined as low, medium, or high, and/or as a guest level, a regular level, a full access level, and/or the like. The discovery restriction level(s) may include the time window(s) to indicate when the discovery restriction level(s) are available.

The discovery restriction level(s) may be configured per PIN element. For example, PIN element A may be configured with a high discovery restriction level and PIN element B may be configured with a low discovery restriction level.

The discovery restriction level(s) may be configured per PIN information. For example, PIN element A may be configured with a high discovery restriction level that is associated with PIN element A's status and a low discovery restriction level that is associated with PIN element A's ID. The discovery restriction level(s) may be configured per PIN service. A high discovery restriction level may be configured for a first service and a low discovery restriction level may be configured for a second service.

A guest PIN element configured with discovery restriction level(s) may discover (e.g., only discover) PIN information corresponding to the configured discovery restriction level(s). For example, a PIN element configured with a high discovery restriction level may not respond to a solicitation request from a guest PIN element configured with a low discovery restriction level. A PIN element may include (e.g., only include) PIN information associated with a low discovery restriction level in a solicitation response if the corresponding solicitation request is from a guest PIN element configured with a low discovery restriction level.

A guest PIN element may be configured with one or more of the following behaviors. The guest PIN element may receive discovery policy configuration information, which may include one or more discovery restriction level(s) and/or security parameters corresponding to the discovery restriction level(s). The guest PIN element may decide to discover PIN information of a PIN based on a local policy. The guest PIN element may send a solicitation request, which may include one or more discovery restriction levels and/or a token generated based on security parameters associated with the discovery restriction levels. The solicitation request may include a PIN identifier and/or PIN information to be discovered. The guest PIN element may receive a solicitation response, which may include a PIN identifier and/or the PIN information being discovered.

A PIN element may be configured with one or more of the following behaviors. The PIN element may receive discovery policy configuration information, which may include one or more discovery restriction levels and/or security parameters associated with the discovery restriction level(s). The PIN element may receive a solicitation request and determine the guest PIN element's discovery restriction level(s). The PIN element may determine whether the guest PIN element is authorized for its discovery restriction level(s), for example, by checking a token associated with the discovery restriction level(s) (e.g., security parameters associated with the restriction levels). The PIN element may send a solicitation response, which may include PIN information that matches the guest PIN element's discovery restriction level(s).

A PIN GW (e.g., PIN element with management capabilities, a PEMC, a PEGC, and/or a combination thereof) may be configured with one or more of the following behaviors. The PIN GW may send discovery policy configuration information to one or more PIN elements. The discovery policy configuration information may include one or more discovery restriction levels and/or security parameters associated with the restriction levels. The PIN GW may receive a solicitation request, for example, from a guest PIN element and may determine the guest PIN element's discovery restriction level(s). The PIN GW may determine whether the guest PIN element is authorized for its discovery restriction level(s), for example, by checking a token associated with the discovery restriction levels (e.g., security parameters associated with the restriction levels). The PIN GW may send a solicitation response, which may include PIN information that matches the guest PIN element's discovery restriction level(s).

Figure 10:
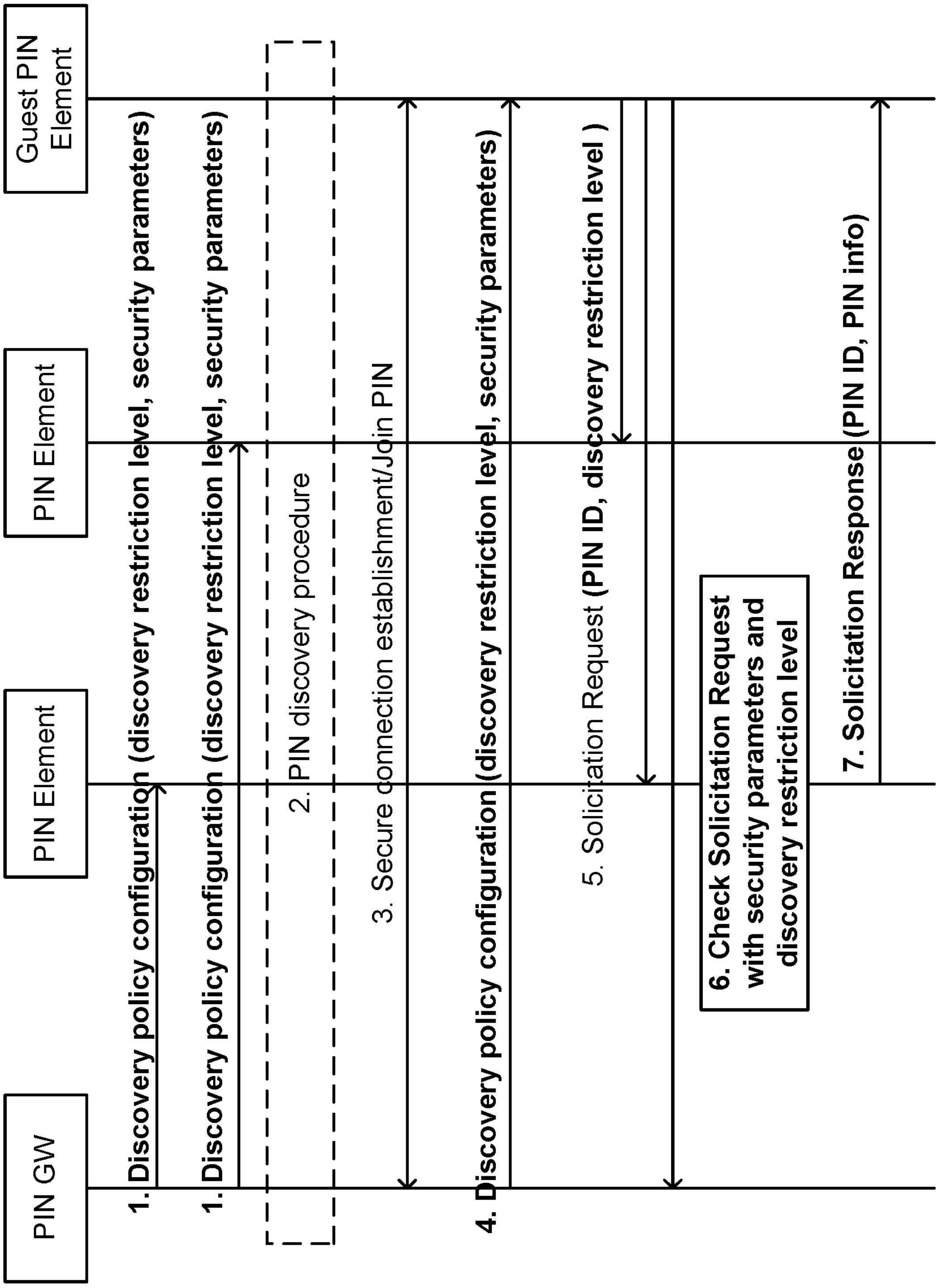
FIG. 10 is a diagram illustrating an example of restricted PIN discovery.

FIG. 10 illustrates an example of restricted PIN discovery. At 1, a PIN GW (e.g., PIN element with management capabilities, a PEMC, a PEGC, and/or a combination thereof) may send discovery policy configuration information to one or more PIN elements. The discovery policy configuration information may include one or more discovery restriction levels and/or security parameters associated with the discovery restriction levels. At 2, PIN discovery may be performed, for example, in accordance with one or more examples described herein. At 3, a guest PIN element may establish a secure connection with the PIN GW (e.g., the guest PIN element may join the PIN associated with the PIN GW). At 4, the PIN GW may send discovery policy configuration information to the guest PIN element. The discovery policy configuration information may include one or more discovery restriction levels and/or security parameters associated with the discovery restriction levels. At 5, the guest PIN element may send a solicitation request, which may include one or more discovery restriction levels configured for the guest PIN element and/or a token generated based on security parameters associated with those discovery restriction levels. The solicitation request may include a PIN identifier and/or other PIN information to be discovered. At 6, a PIN element may determine the guest PIN element's discovery restriction level(s) and/or whether the guest PIN element is authorized for its discovery restriction level(s), for example, by checking a token associated with those discovery restriction level(s). At 7, the PIN element may send a solicitation response with PIN information that matches the guest PIN element's discovery restriction level(s).

Discovery of the availability and/or reachability of a PIN element may be provided. Examples described herein may show how to enable a guest PIN element to discover a PIN element's available and/or reachability.

In examples, the PIN element (e.g., PIN element with management capabilities, a PEMC, a PEGC, and/or a combination thereof) may broadcast, multicast, or groupcast an announcement message, which may include a reachability status. The PIN element reachability status may indicate whether the PIN element may be accessed directly, e.g., via a PIN GW or a PIN relay, or via a core network.

In examples, instead of broadcasting, multicasting, or groupcasting an announcement message, the PIN element may send a solicitation response with a reachability status after receiving a solicitation request from a guest PIN element.

The reachability status may include QoS information and/or security information when the PIN element is accessed directly, e.g., via a PIN GW or a PIN relay, or via a core network.

The reachability status may include a PIN GW's ID, PIN relay' ID, or a PLMN ID when the PIN element may be accessed via a PIN GW, e.g., via a PIN relay, or via a core network.

Reachability status may include an IP address, MAC address, and/or protocol data unit (PDU) session ID which may be used for accessing via a PIN GW, a PIN relay, or via a core network.

Reachability status may include a service ID if the reachability status is available for a service (e.g., specific service), for example, a printer service that may be accessed via a PIN GW.

In examples, if the guest WTRU acts as a PIN GW, the guest WTRU may indicate whether a connection with a core network is available or not.

After discovering a PIN element's reachability status, a guest WTRU may select a communication path, e.g. via a PIN GW, a PIN relay, or via a core network, to communicate with the PIN element.

In examples, when the guest WTRU communicates with the PIN element, the guest WTRU may use the IP address, MAC address, or PDU session ID in the PIN element's reachability status for the communication.

The guest PIN element's behavior may include one or more of the following: send a solicitation request; receive a PIN element's reachability status in a solicitation response; select a communication path based on the reachability status, e.g. via a PIN GW, via a PIN relay, or via a core network; establish a communication path based on the received PIN GW's ID, PIN relay's ID, or PLMN ID; or communicate with the PIN element by using the IP address, MAC address, or PDU session ID based on the received reachability status.

The PIN element's behavior may include one or more of the following: receive a solicitation request or broadcast its reachability status via a solicitation response.

Availability discovery may be provided. Examples described herein may show how to enable a guest PIN element to discover a PIN element's available and/or reachability.

In examples, the PIN element (e.g., a PIN GW, PIN element with management capabilities, a PEMC, a PEGC, and/or a combination thereof) may broadcast an announcement message, which may include an availability status. The PIN element availability status may indicate in which time window the PIN element may be accessed.

The PIN element may send a solicitation response with the availability status after receiving a solicitation request from a guest PIN element. The availability status may include a service ID. The availability status may include location information, which may indicate in which area the PIN element is available for access.

The guest PIN element's behavior may include one or more of the following: send a solicitation request; receive a PIN element's availability status in a solicitation response; determine whether the PIN element is available in a current time window and current location; or communicate with the PIN element.

The PIN element's behavior may include one or more of the following: receive a solicitation request or broadcast its availability status in a solicitation response.

Authentication and/or authorization of PINEs may be provided. Procedures for how the WTRU may discover, connect to, and/or perform authentication and/or authorization procedures with devices in a PIN such as PIN GW, PEMCs, and/or PEGCs may be provided. The procedure may use bootstrapped identifiers and/or aliases to enable the exchange (e.g., secure exchange) of information and/or allow for the execution of the authentication and/or authorization procedures.

PINE identity format(s) may be provided. A PINE ID format may include multiple fields. A first field in the PINE ID may be a value that may be resolved to an MNO ID. The format of the field may be a mobile country code (MCC) and/or a mobile network code (MNC). A second field in the PINE ID may be a value that may be resolved to a network function that may be contacted to execute an authentication and/or authorization procedure with the PINE. For example, the network function may be an authentication, authorization, and accounting (AAA) server, an AAA proxy, an authentication server function (AUSF), or a unified data management (UDM). In examples, the first field may be used to determine a network function that may be contacted to execute an authentication and/or authorization procedure for the PINE. In examples, this field may be resolved to a network function that may be queried to obtain a PIN ID and/or a PINE ID. A third field in the PINE ID may be a value that may be resolved to a subscription identifier that is linked to the PINE. Subscription may identify the PEMC or PINE with gateway capabilities (e.g., PIN element with management capabilities, a PEMC, a PEGC, and/or a combination thereof). A fourth field in the PINE ID may be a value that may be resolved to a device identifier. A fifth field in the PINE ID may be a value that may be resolved to a service provider ID.

Based on the privacy and/or non-linkability considerations, the use of routing information in identities may present a situation. A pine ID pseudonym and/or alias may be a feature, for example, from a security and/or privacy perspective (e.g., point of view).

The PINE ID may be associated with a PINE ID alias. A PINE ID alias may be an indiscriminate ID that may be resolved to a PINE ID. If a PINE ID is provisioned in a PINE, PEMC, or PEGC, a PINE ID alias may be provisioned. The PINE ID may be used in message exchanges and/or broadcast messages to avoid broadcasting, or making visible, the PINE ID and/or the information that it includes. To avoid linkability, such PINE ID pseudonyms and/or aliases may have to be changed frequently.

PIN bootstrap information may be provided. In addition to a PINE ID and a PINE ID alias, a PINE may be configured with PIN bootstrap information.

PIN bootstrap information may include one or more credentials. A credential (e.g., each credential) may be a value and/or an authenticated and/or non-authenticated token (e.g., ticket) that is associated with the PINE ID and used to authenticate the PINE. A credential (e.g., each credential) may be associated with a PIN ID, PEMC ID, and/or PEGC ID. If a credential is associated with a PIN ID, PEMC ID, or a PEGC ID, the PINE may know to use the credential for communication, authentication, and/or authorization (e.g., only for communication, authentication, and/or authorization) within that PIN with a PEMC or PEGC (particular PEMC or PEGC). The credential may be a key, identity, and/or certificate.

PIN bootstrap information may include a PIN ID alias. The PIN ID alias may be a value that is used by the PINE to discover a PIN, PEMC, and/or PEGC. For example, the PIN ID alias may be a value that is broadcasted by PINEs, PEMCs, and/or PEGCs to allow the PINE to discover other PINEs, PEMCs, and/or PEGCs. The PIN ID alias may allow the other PINEs, PEMCs, and/or PEGCs to avoid broadcasting a PIN ID. The PINE ID alias may be a uniform resource identifier (URI) that may be resolved to a real PINE ID or may be a URI ID (e.g., index) pointing to the URI that may be resolved to a real PINE ID.

The PINE's PIN bootstrap information may be used in a procedure between the PINE and a PEMC or PEGC (e.g., discovery, authentication, and/or authorization) and the PEMC or PEGC may obtain (e.g., need to obtain) the PIN bootstrap information for the PINE, or at least a subset of the PINE's PIN bootstrap information. A PEMC or PEGC may obtain the PINE's PIN bootstrap information before or during the execution of an authentication procedure with the PINE. The PINE's PIN bootstrap information may be obtained from the system (e.g., 5GC) via NAS signaling or from a AAA server via user plane interaction. The obtained PIN bootstrap information may be used to authenticate and/or authorize the PINE. The AAA server described herein may be a PIN server.

In examples, PEMC may act as an onboarding PEMC which may provide the connectivity for the PINE and assist in provisioning with PIN bootstrap information from the system (e.g., 5GC) via NAS signaling (e.g., control plane) or from the application server via user plane interactions. The PEMC may broadcast a universal discovery code and/or routable address (e.g., an IP address). The PINE may listen to the broadcast message with the universal discovery code. When the PEMC is discovered, the PINE may connect with the PEMC for onboarding and/or provisioning of PIN bootstrap information. After PIN bootstrap information has been provisioned (e.g., successfully provisioned), PINE may disconnect from the onboarding PEMC and use the provisioned PIN bootstrap information for subsequent procedure(s) between the PINE and a PEMC or PEGC (e.g., discovery, authentication, and/or authorization).

PEMC authorization and/or authentication of a PINE may be provided.

Figure 11:
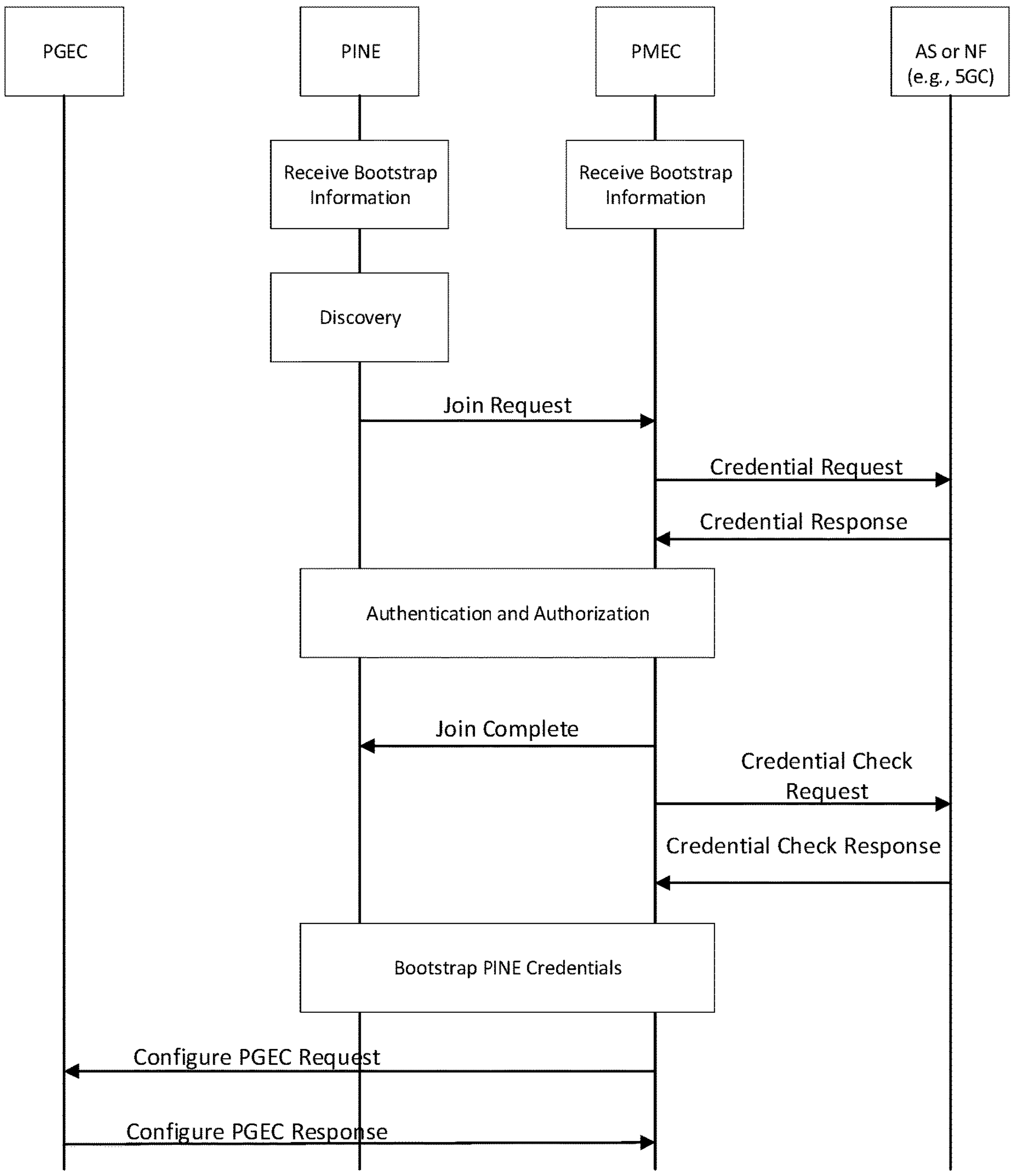
FIG. 11 shows an example procedure for a pin with management capabilities (PEMC) authentication and authorization of a pin element (PINE).

FIG. 11 shows an example procedure for a PEMC authentication and authorization of a PINE. The PINE may provision, bootstrapped, and/or configured with the PIN bootstrap information. The PINE may receive one or more of the following: the PINE ID, PINE ID alias, or the PIN bootstrap information from a server. For example, an application on the PINE such as an application client or a PIN enabler client may receive the PIN bootstrap information from a PIN enabler server. The PINE may be configured with the PIN bootstrap information during the manufacturing process via user interface such as a graphical user interface (GUI). If the PINE is a WTRU, the PINE may receive the PIN bootstrap information from the system (e.g., 5GC) via an NAS message during an authentication and authorization procedure with the system (e.g., 5GC). If the PINE is a WTRU, the PINE may use PIN bootstrap information that was received from the system (e.g., 5GC) via an NAS message during an authentication and/or authorization procedure with the system (e.g., 5GC) to derive a PINE ID, PINE ID alias, and/or credential. For example, the PINE may use a key that may have been included in the PIN bootstrap information to derive a PINE ID, PINE ID alias, and/or credential. A PINE that is a WTRU may use access authentication to bootstrap its application credentials using one or more of the following: General Bootstrapping Architecture (GBA), Authentication and Key Management for Applications (AKMA), or 5G GBA.

The PEMC may receive information about PINEs that are allowed to join the PIN. This information may include the PIN bootstrap information, PINE IDs, PINE ID aliases, and/or a sub-set of the PIN bootstrap information, of the PINEs. The PEMC may receive the PINEs' PIN bootstrap information via an NAS message such as a WTRU configuration update message. The network may determine to send the WTRU configuration update message to the WTRU (e.g., the PEMC) when the PEMC's subscription is updated to indicate that the PINE may join the PIN that is managed by the PEMC. The WTRU configuration update message may be sent to the PEMC when the PINE is linked to the PEMC's subscription. The PEMC may receive the PINEs' PIN bootstrap information via an NAS message such as a PDU session establishment accept message or a PDU session modification command. The network may determine to send the PDU session establishment accept message or a PDU session modification command to the WTRU (e.g., the PEMC) when the PEMC's subscription is updated to indicate that the PINE may join the PIN that the PEMC manages or when the WTRU's subscription is updated to indicate that traffic from the PINE may be routed to or from the DNN/S-NNSAI combination that is used by the PDU session. The PDU session establishment accept message, or a PDU session modification command, may be sent to the PEMC when the PINE is linked to the session management information that is associated with the DNN/S-NSSAI combination in the PEMC's subscription. PINEs' PIN bootstrap information may be received by a PIN enabler client that is hosted on the WTRU. The PIN enabler client may receive the PINEs' PIN bootstrap information from an PIN enabler server in an HTTP message (e.g., user plane). For example, the PIN enabler server may store the PINEs' PIN bootstrap information and may determine to send this information to the PIN enabler client when a PINE is linked to the PEMC's subscription or when the PIN enabler server receives a notification that a PINE is linked to the PEMC's subscription.

The PINE may discover the PEMC or PIN and may determine to join the PIN that is managed by the PEMC. The PINE and PEMC may use the PINEs' PIN bootstrap information in the discovery procedure. For example, the PINEs' PIN bootstrap information may include a discovery value that may be broadcasted by the PEMC. The PEMC may broadcast a message that includes the discovery value and/or a routable address (e.g., an IP address). When the PINE receives the broadcast message, the PINE may check if the discovery value is associated with the PIN bootstrap information that is stored in the PINE. For example, the PINE may check if the discovery value is in the PIN bootstrap information or if the result of a calculation that is performed on the discovery value matches information that is stored in the PIN bootstrap information of the PINE. For example, the PINE may perform a hash operation on the received discovery value and the PINE's identifier and check if it matches a value in the PIN bootstrap information. If the PINE determines that the discovery value is associated with the PINE's PIN bootstrap information, the PINE may consider the PEMC to be discovered and proceed to techniques described herein.

As described herein, the PINE may use the PIN ID alias to discover the PIN. For example, the PINE may discover and select a PEMC that is broadcasting the PIN ID alias or the PINE may broadcast a request for a PEMC to broadcast the PIN ID Alias. The discovery value may be the PIN ID alias.

The PINE may use the routable address that was received (e.g., as described herein) to send a join request to the PEMC to join the PIN and to begin an authentication and/or authorization procedure. The join request (e.g., all or part of the join request) may be confidentiality, integrity, and/or replay protected using security material that is part of the PINE bootstrap information. The join request may include the PINE ID or PINE ID alias. The join request may include a part that is not encrypted. The not encrypted part may include the discovery value (e.g., the observed discovery value) that was received by the PINE and triggered the PINE to send the join request. For example, the discovery of value may be specific to one or more PINE(s) and the PEMC may use the received discovery value to determine what PINE bootstrap information may be used to decrypt the join request. The PEMC may use the received discovery value to determine what PINE sent the request.

Reception of the join request by the PEMC may trigger the PEMC to obtain the information (e.g., necessary information) to authenticate and/or authorize the PINE. It may be that the PEMC does not have the information (e.g., necessary information) to authenticate and/or authorize the PINE. For example, it may be the PEMC has not yet received or obtained PINE bootstrap information for the PINE that sent the join request. In such a case, reception of the join request may trigger an exception processing that may include a request to the MNO to obtain PINE bootstrap information for the PINE. The request to obtain the PINE bootstrap information for the PINE may be sent via an NAS message and may include a value that was received in the join request. For example, the join request may have included the PINE ID and/or the observed discovery value. The AMF may use the PINE ID and/or observed discovery value to determine an NF, AAA server, or AAA-P that is associated with the PINE and obtain PINE bootstrap information for the PINE from the NF, AAA Server, or AAA-P. The obtained PINE bootstrap information may be sent to the PEMC via an NAS message. The PEMC may use the PINE bootstrap information to authenticate and/or authorize the WTRU. When the request to obtain the PINE bootstrap information for the PINE is sent via an NAS message, the PEMC may include the PINE ID that was included in the join request via the NAS message. When the AMF receives the NAS message, the AMF may use the PINE ID to determine where to forward the request for PINE bootstrap information. For example, the AMF may perform a domain name system (DNS) lookup on the PINE ID. The AMF may perform a DNS lookup on a field (e.g., single field) of the PINE (e.g., the second field of the PINE ID). The AMF may have been configured with a mapping between MNO IDs (e.g., or service provider IDs) and server identifiers so that the AMF may determine which server to contact based on the MNO ID (e.g., or service provider IDs) that is part of the PINE ID. If the join request included a PINE ID alias, the AMF may resolve (e.g., first resolve) the PINE ID alias to a PINE ID. The request to obtain the PINE bootstrap information for the PINE may be sent via a data plane message to a server (e.g., an HTTP message) and may include a value that was received in the join request. For example, the join request may have included the PINE ID and/or the observed discovery value. The server may use the PINE ID and/or observed discovery value to obtain PINE bootstrap information for the PINE. The obtained PINE bootstrap information may be sent to the PEMC via a response message. The PEMC may use the PINE bootstrap information to authenticate and/or authorize the WTRU. When the request to obtain the PINE bootstrap information for the PINE is sent via a data plane message to a server (e.g., an HTTP message), the PEMC may use the PINE ID (e.g., all or part of the PINE ID) that was included in the join request to determine what server to send the join request to. For example, the PEMC may perform a DNS lookup on the PINE ID. The PEMC may perform a DNS lookup on a field (e.g., single field) of the PINE (e.g., the second field of the PINE ID). The PEMC may have been configured with a mapping between MNO IDs (e.g., or service provider IDs) and server identifiers so that the PEMC may determine which server to contact based on the MNO ID (e.g., or service provider IDs) that is part of the PINE ID. If the join request included a PINE ID alias, it may be that the PEMC may resolve (e.g., only resolve) the PINE ID alias to a server identity (e.g., the identity of a server that knows the PINE ID that is associated with the PINE ID alias).

When the PEMC obtains the PINE bootstrap information, the PEMC may execute an authentication and/or authorization procedure with the PINE.

The PEMC may send a message to the PINE to indicate that the authentication and/or authorization procedures are completed.

The PEMC may send a request to the system (e.g., 5GC) to verify that the credential(s) that were provided by the PINE were authentic. For example, it may be that the PEMC did not have access to the system (e.g., 5GC) when the PEMC executed the authentication and/or authorization procedure with the PINE and the PEMC may like to check that the provided credential(s) are up-to-date.

The PEMC and PINE may perform a PIN bootstrap procedure where the PEMC configures the PINE with credentials that may be used by the PINE to communicate with other devices within the PIN. For example, the PEMC may determine what PEGC(s) the PINE may communicate with and may configure the PINE with a PEGC ID, a routable PEGC address (e.g., an IP Address), and a value (e.g., key ID and/or key index) that may be used to derive and/or obtain a key that may be used to communicate (e.g., securely communicate) with the PEGC.

The PEMC may configure other devices with information that may be used to authenticate and/or authorize the PINE. For example, the PEMC may configure a PEGC with the PINE ID, PINE ID alias, and/or a value that may be used to derive a key that may be used to communicate with the PINE. In examples, where there are multiple PEMCs in the PIN, the PEMC may configure the other PEMCs with the information.

PEGC authorization and/or authentication of a PINE may be provided. The PINE may contact the PEGC and use the credential(s) that were provided by the PEMC to perform a mutual authentication and/or authorization procedure with the PEGC. For example, to join request, credential request, credential response, authentication and/or authorization, join complete, credential check request credential check response, and/or bootstrap PINE credential(s) described herein may be executed between the PINE and PEGC with the credential(s) that were provided by the PEMC. In examples, the PEGC may use the PEMC to help authenticate and/or authorize the PINE.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

The invention claimed is:

1. A first wireless transmit/receive unit (WTRU), the first WTRU comprising:
a processor configured to:
determine information associated with a personal Internet of Things (IOT) network (PIN), wherein the information indicates a PIN identification (ID) and one or more services associated with the PIN;
send, based on the information, a first message to a second WTRU, wherein the first message indicates the PIN ID and indicates the one or more services associated with the PIN;
receive a second message from the second WTRU, wherein the second message indicates the PIN ID, indicates a capability associated with the second WTRU, and indicates a PIN service; and
send a third message to the second WTRU in response to the second message.

2. The first WTRU of claim 1, wherein the information further indicates at least one of a PIN description, a PIN topology, or a PIN availability.

3. The first WTRU of claim 1, wherein the third message indicates at least one of a PIN capability, a PIN reachability, or a service associated with the PIN.

4. The first WTRU of claim 1, wherein the processor is configured to determine the information that is associated with the PIN by receiving a fourth message from a third WTRU, wherein the third WTRU is at least one of a PIN gateway, a PIN element with management capabilities (PEMC), or a PIN element with gateway capabilities (PEGC).

5. The first WTRU of claim 1, wherein the processor is further configured to send a fourth message to the second WTRU, wherein the fourth message indicates a request to establish a connection between the first WTRU and the second WTRU.

6. The first WTRU of claim 1, wherein the information further indicates a PIN description and a list of PIN elements with management capabilities (PEMCs) associated with the PIN.

7. A method performed by a first wireless transmit/receive unit (WTRU) for discovering a personal Internet of Things (IOT) network (PIN), the method comprising:
determining information associated with the IoT PIN, wherein the information indicates a PIN identification (ID) and one or more services associated with the PIN;
sending, based on the information, a first message to a second WTRU, wherein the first message indicates the PIN ID and indicates the one or more services associated with the PIN;
receiving a second message from the second WTRU, wherein the second message indicates the PIN ID, indicates a capability associated with the second WTRU, and indicates a PIN service; and
sending a third message to the second WTRU in response to the second message.

8. The method of claim 7, wherein the information further indicates at least one of a PIN description, a PIN topology, or a PIN availability.

9. The method of claim 7, wherein the third message indicates at least one of a PIN capability, a PIN reachability, or a service associated with the PIN.

10. The method of claim 7, wherein determining the information that is associated with the PIN comprises receiving a fourth message from a third WTRU, wherein the third WTRU is at least one of a PIN gateway, a PIN element with management capabilities (PEMC), or a PIN element with gateway capabilities (PEGC).

11. The method of claim 7, wherein the method further comprises sending a fourth message to the second WTRU, wherein the fourth message indicates a request to establish a connection between the first WTRU and the second WTRU.

12. The method of claim 7, wherein the information further indicates a PIN description and a list of PIN elements with management capabilities (PEMCs) associated with the PIN.

13. A first wireless transmit/receive unit (WTRU), the first WTRU comprising:

a processor configured to:

receive a solicitation request message from a second WTRU, wherein the solicitation request message indicates a personal Internet of Things (IOT) network (PIN) identification (ID) that is associated with the PIN, and indicates a request for information that is associated with the PIN;

send a solicitation response message to the second WTRU, wherein the solicitation response message indicates the PIN ID and indicates the requested information that is associated with the PIN;

receive a request message from the second WTRU that is based on the requested information, wherein the request message indicates the PIN ID, indicates a WTRU ID that is associated with the second WTRU, and indicates a request to join the PIN; and send a response message to the second WTRU when the WTRU ID has been authenticated, wherein the response message indicates that the second WTRU is authorized to join the PIN, and wherein the response message indicates authorization information.

14. The first WTRU of claim 13, wherein the processor is further configured to send a discovery message to the second WTRU, wherein the discovery message indicates the PIN ID that is associated with the PIN.

15. The first WTRU of claim 13, wherein the processor is further configured to receive a connection request message, wherein the connection request message indicates a request to establish a connection to the PIN based on the authorization information.

16. The first WTRU of claim 13, wherein the processor is further configured to authenticate the WTRU ID.

17. The first WTRU of claim 13, wherein the processor is further configured to authenticate the WTRU ID by sending an authentication request to a network node.

18. The first WTRU of claim 13, wherein the processor is further configured to authenticate the WTRU ID by authenticating the second WTRU using authentication information.

19. The first WTRU of claim 13, wherein the processor is further configured to determine a service that the second WTRU is permitted to access.

20. The first WTRU of claim 13, wherein the response message further indicates a service that the second WTRU is permitted to access.

* * * * *